US012062008B2

(12) United States Patent
Turner et al.

(10) Patent No.: US 12,062,008 B2
(45) Date of Patent: Aug. 13, 2024

(54) METHODS AND SYSTEMS FOR ITEM DELIVERY ALONG DELIVERY ROUTES

(71) Applicant: United States Postal Service, Washington, DC (US)

(72) Inventors: Alison Frankowski Turner, Arlington, VA (US); Marc D. McCrery, Arlington, VA (US); James J. Boldt, Leesburg, VA (US)

(73) Assignee: United States Postal Service, Washington, DC (US)

( * ) Notice: Subject to any disclaimer, the term of this patent is extended or adjusted under 35 U.S.C. 154(b) by 404 days.

(21) Appl. No.: 16/850,970

(22) Filed: Apr. 16, 2020

(65) Prior Publication Data

US 2020/0334637 A1 Oct. 22, 2020

Related U.S. Application Data

(60) Provisional application No. 62/834,805, filed on Apr. 16, 2019.

(51) Int. Cl.
*G06Q 10/08* (2023.01)
*G06Q 10/083* (2023.01)
*G06Q 10/0835* (2023.01)

(52) U.S. Cl.
CPC ... *G06Q 10/08355* (2013.01); *G06Q 10/0838* (2013.01)

(58) Field of Classification Search
CPC ............. G06Q 10/08; G06Q 10/08355; G06Q 10/0838
See application file for complete search history.

(56) References Cited

U.S. PATENT DOCUMENTS 9,086,292 B2 7/2015 Horvitz et al.
9,928,475 B2 3/2018 Burnett
(Continued)

OTHER PUBLICATIONS

G. Mbiydzenyuy, M. Dahl and J. Holmgren, "Road travel time prediction—A micro-level sampling approach," 16th International IEEE Conference on Intelligent Transportation Systems (ITSC 2013), The Hague, Netherlands, 2013, pp. 1613-1618, doi: 10.1109/ITSC.2013.6728460. (Year: 2013).*
(Continued)

*Primary Examiner* — Scott M Tungate
(74) *Attorney, Agent, or Firm* — Knobbe, Martens, Olson & Bear, LLP

(57) ABSTRACT

Methods and systems for coordinating item delivery are disclosed. In one aspect, a method comprises receiving delivery route data from a carrier device, generating, based on the delivery route data, a digital route for a delivery resource, the digital route comprising a street portion and an office portion, wherein the street portion comprises: a plurality of delivery points at which the carrier is to perform a service, and a segmented travel course for the carrier to travel to each of the plurality of delivery points in a determined sequence, and wherein the office portion comprises details regarding one or more office activities performed by the carrier to prepare for or conclude the street portion of a delivery route. The method further comprises determining an expected duration of time for: (1) travel of each segment of the travel course, (2) completion of each of the street activities, and (3) completion of the one or more office activities.

17 Claims, 17 Drawing Sheets

(56) References Cited

U.S. PATENT DOCUMENTS

| | | | |
|---|---|---|---|
| 2003/0036938 A1 | 2/2003 | Dutta et al. | |
| 2006/0167734 A1* | 7/2006 | Scott | G06Q 99/00 705/7.22 |
| 2013/0297095 A1* | 11/2013 | Kwak | G06Q 10/0639 701/1 |
| 2014/0278070 A1* | 9/2014 | McGavran | G06N 20/00 701/538 |
| 2015/0177011 A1* | 6/2015 | Ibrahimi | G01C 21/343 701/465 |
| 2017/0262790 A1* | 9/2017 | Khasis | G08G 1/012 |
| 2018/0174446 A1 | 6/2018 | Wang | |
| 2019/0063939 A1 | 2/2019 | Chai et al. | |
| 2019/0102960 A1 | 4/2019 | Thibault et al. | |
| 2019/0108479 A1 | 4/2019 | Dearing | |
| 2019/0178672 A1 | 6/2019 | Woolley | |
| 2019/0178679 A1 | 6/2019 | Woolley | |
| 2020/0200553 A1 | 6/2020 | Voznesensky et al. | |
| 2020/0400439 A1 | 12/2020 | Thompson et al. | |
| 2020/0400441 A1 | 12/2020 | Efland | |
| 2021/0182757 A1 | 6/2021 | Kaneichi et al. | |
| 2021/0182787 A1 | 6/2021 | Mouli et al. | |
| 2022/0013014 A1 | 1/2022 | Xu et al. | |
| 2022/0036284 A1* | 2/2022 | Oyama | G06Q 10/063114 |
| 2022/0083925 A1* | 3/2022 | Varadarajan | G06Q 10/047 |
| 2022/0157167 A1 | 5/2022 | Gupta et al. | |
| 2022/0341747 A1 | 10/2022 | Levin et al. | |
| 2022/0373352 A1 | 11/2022 | Turner et al. | |

OTHER PUBLICATIONS

Marco, Diana et al., Freight distribution in urban areas: a method to select the most important loading and unloading areas and a survey tool to investigate related demand patterns, Springer Open, European Transport Research review, (https://etrr.springeropen.com/articles/10.1186/s 12544-020-00430-w) (Year: 2020).

Timpner, Julian et al., Query-response geocast for vehicular crowd sensing, Science Direct, Ad Hoc Networks vol. 36, Part 2, Jan. 2016, pp. 435-449 (https://www.sciencedirect.com/science/article/pi i/S 1570870515001286) (hereinafter "Timpner") (Year: 2016).

* cited by examiner

METHODS AND SYSTEMS FOR ITEM DELIVERY ALONG DELIVERY ROUTES

CROSS-REFERENCE TO RELATED APPLICATIONS

This application claims benefit of priority to U.S. provisional Application No. 62/834,805, filed on Apr. 16, 2019 and entitled METHODS AND SYSTEMS FOR ITEM DELIVERY ALONG DELIVERY ROUTES", the entirety of which is incorporated herein for all purposes.

FIELD

This disclosure relates to using data received from entities servicing a particular route to augment that route, and in particular, to dynamically augment an existing route or generate a combination of new routes that improve efficiencies for the entities servicing the route while also improving details of the route according to the data from past route completions.

BACKGROUND

Delivery systems/services and corresponding routes are becoming more common place. As more service providers offer such delivery services, identifying and improving on efficiencies of the delivery routes is critical. Part of identifying and improving efficiencies may involve identifying and correlating existing delivery routes with actual delivery point and tracking data. Furthermore, updating and/or creating new delivery routes based on demand (for example, including on-demand requests) and average use, etc., is critical in maintaining and/or improving efficiencies. Therefore, additional techniques of identifying and improving efficiencies of delivery routes are needed.

SUMMARY

Methods and apparatuses or devices disclosed herein each have several aspects, no single one of which is solely responsible for its desirable attributes. Without limiting the scope of this disclosure, for example, as expressed by the claims which follow, its more prominent features will now be discussed briefly. After considering this discussion, and particularly after reading the section entitled "Detailed Description" one will understand how the described features provide advantages that include data authentication services.

In one aspect, a method comprises receiving delivery route data from a carrier device, generating, based on the delivery route data, a digital route for a delivery resource, the digital route comprising a street portion and an office portion, wherein the street portion comprises: a plurality of delivery points at which the carrier is to perform a service, and a segmented travel course for the carrier to travel to each of the plurality of delivery points in a determined sequence, and wherein the office portion comprises details regarding one or more office activities performed by the carrier to prepare for or conclude the street portion of a delivery route. The method further comprises determining an expected duration of time for: (1) travel of each segment of the travel course, (2) completion of each of the street activities, and (3) completion of the one or more office activities.

In another aspect, an apparatus for processing item delivery is disclosed. The apparatus comprises a hardware memory configured to store processor executable instructions and one or more processors execute the processor executable instructions. The one or more processors execute the processor executable instructions to receive delivery route data from a mobile computing device, generate, based on received the delivery route data, a digital route for a delivery resource, the digital route comprising a street portion and an office portion, wherein the street portion comprises: details regarding a plurality of delivery points at which the carrier is expected to perform a service, details regarding a segmented travel course for the carrier to visit each of the plurality of delivery points in a predetermined sequence and along accessible paths, and details regarding street activities that the carrier performs at the plurality of delivery points; and wherein the office portion comprises details regarding one or more office activities performed by the delivery resource to prepare for or conclude the street portion of the delivery route, and determine an expected duration of time for: (1) travel of each segment of the travel course, (2) completion of each of the street activities, and (3) completion of the one or more office activities.

In another aspect, another method of updating a route based on delivery route data is disclosed. The method comprises receiving a digital route model representative of a route traveled by a delivery resource and comparing a nominal delivery route with the received digital route model. The method further comprises calculating a route evaluation based on the comparison between the nominal delivery route and the digital route model and identifying one or more travel portions of the digital route model that deviate from the nominal delivery route. The method also further comprises identifying any delivery point locations which deviate from the nominal delivery route, determining whether a time to complete one or more segments of the digital route model deviates from the nominal delivery route, and generating a digital route model score based on the comparison.

BRIEF DESCRIPTION OF THE DRAWINGS

These drawings and the associated description herein are provided to illustrate specific embodiments of the invention and are not intended to be limiting.

DETAILED DESCRIPTION

Figure 1:
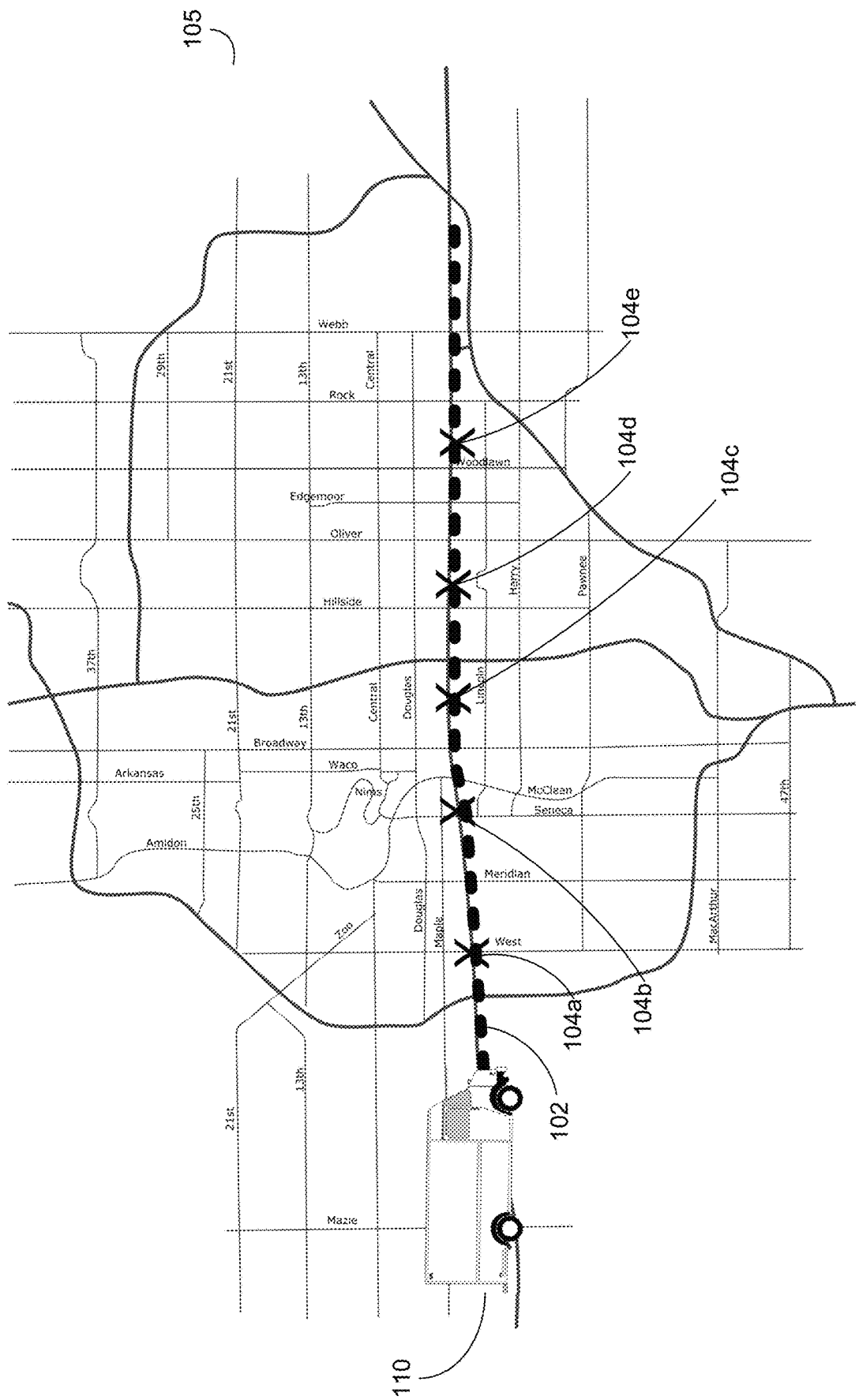
FIG. 1 is an overview diagram of a geographic region in which a localized delivery system is implemented.

The features, aspects and advantages of the present development will now be described with reference to the drawings of several embodiments which are intended to be within the scope of the embodiments herein disclosed. These and other embodiments will become readily apparent to those skilled in the art from the following detailed description of the embodiments having reference to the attached figures, the development not being limited to any particular embodiment(s) herein disclosed.

The present disclosure relates to systems and methods for generating and/or augmenting routes for delivery systems/services. In some embodiments, the systems and methods disclosed herein are configured to receive customer requests and, based on the customer requests and the carrier statuses, update routes and corresponding schedules of route carriers based on existing route information and the customer requests. In some embodiments, the systems and methods disclosed herein are configured to receive data from the carriers and use this data to augment and/or generate new routes to improve efficiencies in the delivery systems.

As used herein, the term "item" may refer to discrete articles in the distribution network, such as mail pieces, letters, flats, magazines, periodicals, packages, parcels, goods handled by a warehouse distribution system, baggage in a terminal, such as an airport, etc., and the like. The term item can also refer to trays, containers, conveyances, crates, boxes, bags, and the like. As used herein, the term "carrier" may refer to an individual assigned to a route who delivers the items to each destination. The term may also refer to other delivery resources, such as trucks, trains, planes, automated handling and/or delivery systems, personnel such as carriers and other employees, and other components of the distribution network.

The present disclosure also relates to systems and methods to analyze items sent from or received in a geographic area to identify potential information regarding the item that may provide additional revenue streams for the distribution network.

Additionally, as used herein, the term "resident" may refer to any individual or entity that resides, works, visits, or is associated with an address. For example, as used herein, a person at his or her office is a resident, as is a student or teacher at a school. As used herein, a resident can be an entity capable of sending items from an address and receiving items at an address. Additionally, the term "residence" may refer to any building having an assigned physical address, such as a house, an office building, an apartment, a factory, a school, etc. As used herein, a residence can be any location capable of being a destination for items within the distribution network or being a return address for items in the distribution network.

For example, an item delivery (IDS) service such as the United States Postal Service (USPS), the United Parcel Service (UPS), or Federal Express (Fed-Ex) may deliver items (for example, mail), such as letters, flats, parcels, packages, bulky items, etc., according to static and/or dynamic routes. The United States Postal Service (USPS) will be used in the present disclosure to describe exemplary embodiments, but the present disclosure is not limited thereto. When referencing generically to any of the services listed above or any IDS in addition to those listed above, the phrase "item delivery system" or "IDS" will be used to indicate such generalities.

In some embodiments, the delivery service may deliver and/or pickup items over a large geographic area that is divided into one or more delivery routes. In some embodiments, the route(s) may be generated based on address information only when reviewing the geographic area. Accordingly, the routes may not account for variances or details that are particular to addresses or delivery points. For example, the route(s) may mistakenly view an apartment building as including only one actual delivery point (otherwise referred to as a delivery stop) while, in actuality, each apartment actually has its own delivery point. Alternatively, the initial generated route may not account for traffic occurrences or variances based on times of day. For example, the initial route may not account for speed limits in school zones that fluctuate based on time of day or high density traffic lights that are only active during high traffic periods (for example, rush hour). In delivery systems that track efficiencies and/or grade carrier service based on how well the carrier's movements for the day track their corresponding routes, such "mistakes" or traffic occurrences can affect the carrier's efficiencies or grade because the route to which the carrier's movements are compared is incorrect. Accordingly, systems and methods configured to dynamically augment existing and/or create new routes based on information from the carrier's movements are desired. Accordingly, systems and methods configured to dynamically augment existing and/or create new routes based on information from the carrier's movements are desired. As described herein, any particular geographic area may include multiple routes; however, for purposes of description herein, discussion is focused on a single exemplary route but applies equally to any and all item servicing and delivery routes.

The USPS delivers items, such as mail and packages, to every physical address in the United States on a daily basis, Monday through Saturday. The USPS is tasked with providing secure, reliable, and affordable delivery of items to every address in the United States, U.S. territories, and U.S. military installations worldwide. For example, the USPS delivers more than 528 million items to over 152 million destinations (addresses) every day. In delivering these items to each of these addresses, in the United States and worldwide, the USPS may establish numerous routes for carriers to travel when distributing the mail.

A distribution network of may comprise multiple levels. For example, the distribution network may comprise regional distribution facilities, hubs, and unit delivery facilities, or any other desired level. For example, the (nationwide) distribution network may comprise one or more regional distribution facilities having a defined coverage area (such as a geographic area, for example a state or a metropolitan area), designated to receive items from intake facilities within the defined coverage area, or from other regional distribution facilities. The intake facility may function to be the location or facility where individual items are, for the first time in the distribution network, identified and entered into the tracking of the distribution network. The regional distribution facility can sort items for delivery to another regional distribution facility, or to a hub level facility within the regional distribution facility's coverage area. A regional distribution facility can have one or more hub level facilities within its defined coverage area. A hub level facility can be affiliated with a few or many unit delivery facilities, and can sort and deliver items to the unit delivery facilities with which it is associated. In some embodiments, the unit delivery facility may also serve as the intake facility. In the case of the USPS, the unit delivery facility may be associated with a ZIP code. The unit delivery facility can receive items from local senders, and from hub level facilities or regional distribution facilities. The unit delivery facility can also sort and stage the items intended for delivery to destinations within the unit delivery facility's coverage area.

As described above, the distribution network employed may comprise numerous pieces of equipment located in various facilities that may automatically route items according to information indicated on the items, physical characteristics of the items, and/or postage characteristics. For example, a letter mailed from San Diego, CA, to Washington, D.C., with First Class postage may be routed differently than a large package mailed between the two locations. Similarly, a second letter mailed with Next Day postage may be routed differently than the letter mailed with First Class postage. The variety of potential routes for different types of items or different postage services indicates the benefit of distributing a system throughout the distribution network (for example in multiple intake and unit delivery facilities) to maximize the amount of information gathered by the system to associate with residences and addresses.

In some embodiments, the delivery system utilizes a base route structure to deliver mail to business and residential customers. The base may be a fixed set of addresses that are specified in an address management system (AMS). Within a particular delivery unit of the delivery system, the carrier performs various activities (e.g., casing mail, sorting parcels and loading the delivery vehicle, otherwise designated as "office" activities) necessary to prepare the carrier's route's mail for delivery on a particular day. These "office" activities are similar in form each day but may require substantially different amounts of time because of day-to-day differences in mailstream volumes. Other carrier activities may be more directly associated with servicing the route, for example driving, servicing mailboxes and performing services at the delivery points, such as a customer's door (e.g., delivering large parcels) (otherwise designated as "street" activities). A line-of-travel for the carrier along the route should be the same each day; similarly, the time required for the route should be approximately the same each day if: 1) all customers on the route receive mail for the day; 2) there are no door services for the day; and 3) there are no "extreme" driving disruptions (e.g., detours, traffic, and so forth). However, variability in the at-door services, particularly parcel delivery, often causes both the street time and the line-of-travel to vary from day to day.

"Standard time" may identify, for a delivery route, a time required by an experienced and motivated worker of normal skill and ability, working at a normal workday pace, to perform a specific task under specific conditions with allowance time to meet personal needs, overcome the fatiguing aspects of work, and compensate for unavoidable delays. As applied herein, this concept is critical both for designing good routes for carriers and for managing the carriers who service these routes. Without a reliable method for estimating the time required to service a route, there is no way to know if the route's required activities can all be performed within an acceptable workday. Also, since for the street portion of the route, a carrier is "out-of-sight" of any supervisor, and no two routes are the same, it is not possible to objectively evaluate the performance of a carrier without some concept of standard time.

In some embodiments, the delivery system may use a standard route time to define the base hours used as the basis for carrier pay for carriers that service one or more routes. Each carrier is responsible for performing all required activities on his/her defined route. When these required activities are completed, the carrier's workday for the delivery service is complete, regardless of the actual time required to complete the activities. This use of delivery route standards requires sufficient precision for a determination that the standard route time is fair to both the delivery system and the carriers. If the standard route time is fair, this concept for managing delivery systems has significant advantages for both parties. The delivery system is assured of getting a fair amount of work for a fair amount of pay with very little management required. The carriers are enabled to work at their own pace and to get the benefit of working "smarter and/or faster" by being allowed to end their workday when the defined activities have been completed. The primary challenge is to have rigorous engineering processes and systems that generate fair standards and keeps them fair in a changing environment. A secondary challenge is to maintain sufficient rigor and transparency of these processes to continuously assure both parties that the standards are indeed fair.

City and rural routes may be handled similarly or differently by the delivery system. For example, for city routes, the delivery system may use standard route times to make minor modifications in a city carrier's assigned work for the day and as a guideline for the time the route should require. However, the standard route time for city routes is only used as a management guide to measure carrier performance and does not impact the city carrier's pay, while for rural routes, the standard route times are a foundation for the rural carrier's pay. Accordingly, the precision required for city carrier standards is not as great as that required for rural carriers since the standards are not used as a basis for city carrier pay but are a basis for rural carrier pay. While the description below may focus on components and systems specific to rural routes, such components and systems, and corresponding methods and functions, may be applied to any routes serviced by the delivery system (for example, city, urban, rural, and so forth).

The carriers that work the various routes for the USPS (or other delivery system) may utilize various equipment that the delivery system may use to track movements, etc., of the carrier. For example, each carrier may utilize a single mobile delivery device (MDD) that provides various data, including global positioning system (GPS) "breadcrumb" data and scan data of various information from scanned items being delivered and/or picked up. Such breadcrumbs and scan information provide a wealth of information relating to delivery activities. Once the breadcrumbs and scan data are processed by various algorithms, this MDD data can be used to provide travel and cost information useful to augmenting routes within the delivery system. In some embodiments, such augmenting of routes may be automatic/dynamic and may result in time and cost optimized routes, especially in rural areas where deliveries many be less common. However, such augmenting of routes is applicable in all locales and routes.

In some embodiments, one or more algorithms process received GPS breadcrumbs, parcel scans (PTR) performed by the carrier, delivery address data (AMS), and road network data (such as third party road data) to optimize the routes. For example, route management and planning software may use these data as inputs to optimize the routes using an optimization engine. In some embodiments, in order to utilize the route management and planning software, the algorithms used to process these data may be refined in various ways to make it usable in the route management and planning software. For example, the algorithms may process the data to make it more usable in optimization approaches that include optimizing a route without adjusting delivery points along the route or via re-assigning delivery points among a plurality of routes to reduce a total number or routes, to re-distribute the territory of a vacant route, and so forth. Use of the algorithms and route management and planning software may provide for development of optimized (i.e., most efficient) routes for use by carriers in the delivery system, for example with respect to salary, vehicle, and fuel costs.

FIG. 1 is an overview diagram of a geographic region 105 in which a localized delivery system (not shown) is implemented. The delivery system, described with further reference to FIG. 2, may comprise or utilize an automated system, a software interface, or a live attendant, for example. The delivery system includes or utilizes a delivery vehicle 110 traveling across the geographic region 105. At any particular time, a first delivery vehicle 110 may be located along a first route 102. One or more other delivery vehicles (not shown) may travel across the geographic region 105 along other routes. In some embodiments, the delivery vehicle 110 may be part of one or more transportation services and may travel according to one or more delivery routes that are static and predetermined or dynamic and variable.

The route 102 may comprise one or more stops 104a-104e within the geographic region. The delivery vehicle 110 may travel along the route 102 and stop at the one or more stops 104a-104e to pick up or drop off one or more items. In some embodiments, the stops are at businesses, residences, or other standalone mailbox locations. Accordingly, the stops may be located in close proximity to each other or with large distances between one or more of the stops. Though the route 102 as shown is generally straight, the route 102 may include any number of turns, stops, etc.

In some embodiments, the stops 104 shown on the route 102 correspond to dynamic or static stops. The dynamic stop is a stop that is dynamically added or removed from the route 102 while the delivery vehicle 110 is traveling along the route 102. For example, while the delivery vehicle 110 is traveling along the route 102, a customer may contact the delivery system operating in the geographic region 105 to request or coordinate a pickup and/or delivery of an item or good. The static stop is a stop that is not added or removed from the route 102 while the delivery vehicle 110 is travelling along the route 102 but rather is permanently part of the route 102.

The delivery system faces costs for use of the delivery vehicle 110, either via a contract with a third-party or directly through a driver, operator, etc., that is associated with the delivery system (for example, an employee of the delivery system). The delivery system may use the route 102 to estimate the costs of the delivery vehicle 110 and driver, etc. For example, the delivery system uses the route 102 to estimate an expected amount of time for travel along the route 102 and servicing of the stops 104a-104e and uses this estimated amount of time to then generate the cost for the route 102, which may include a wage for the carrier, costs of the delivery vehicle 110, etc. Accordingly, accurate information regarding the route 102 is useful in estimating an accurate cost for the route 102. Furthermore, while the route 102 accounts for stops at each address along the route, in every day operation, only a subset of the stops may generally be required, and the information regarding the route 102 may account for either the full route 102 (with all stops) or only an average of the subset of stops generally required.

The delivery system may include one or more components that utilize information from the delivery vehicle 110 and/or the driver of the delivery vehicle 110 to generate and/or update the route 102 along which the delivery vehicle 110 travels to pick up and distribute items.

The disclosed methods and systems can be used on a local level, such as depicted in FIG. 1, and can be used on a city or town level, a county level, a state level, a regional level, a national level, or with any desired geographic area.

Figure 2:
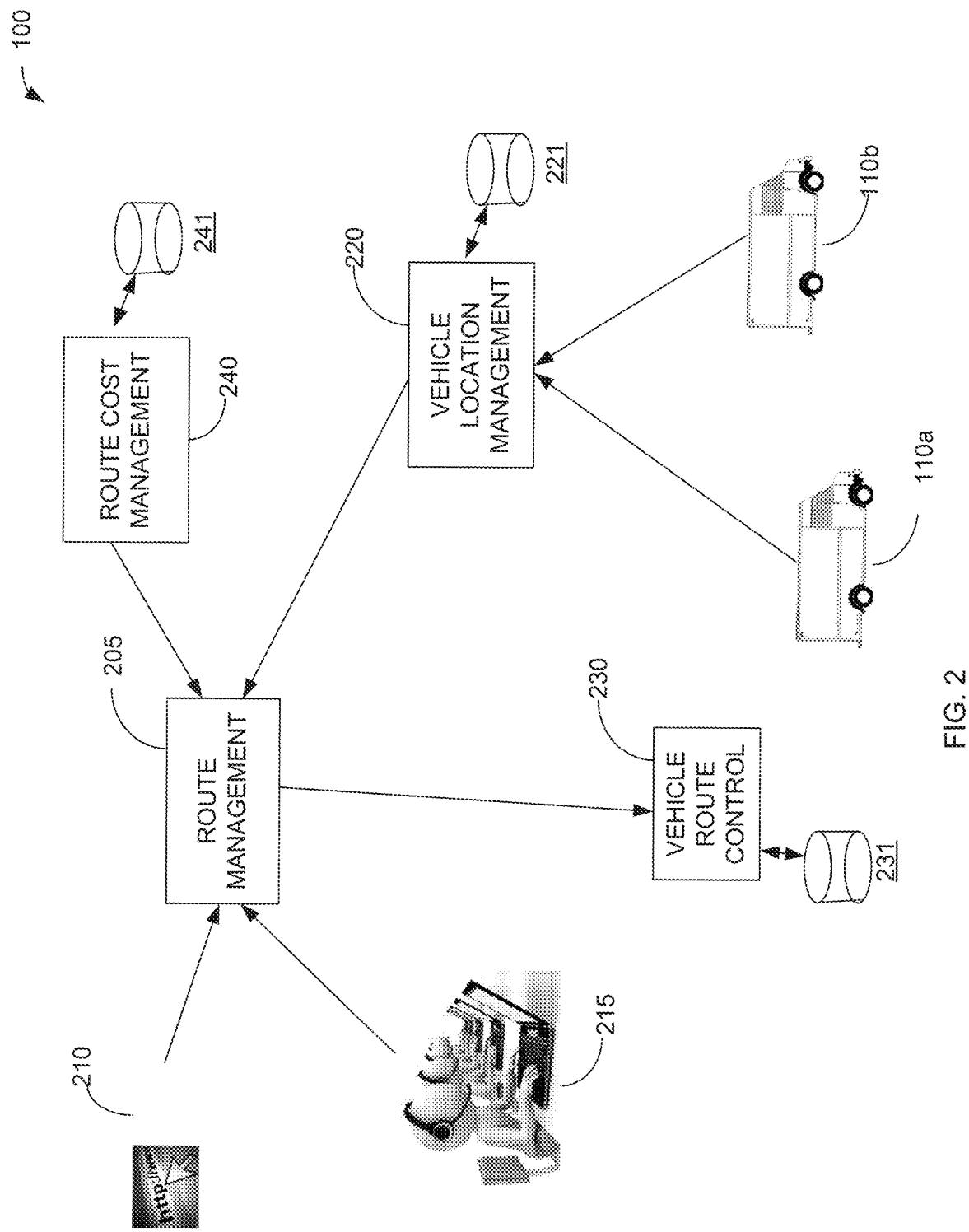
FIG. 2 is an exemplary block diagram of the localized delivery system.

FIG. 2 is an exemplary block diagram of a portion of the localized delivery system 100. The localized delivery system 100 (also referred to herein as the delivery system 100) includes a route management component 205, a vehicle location management component 220, a vehicle location database 221, a vehicle route control component 230, a vehicle route database 231, a cost management component 240, and a route cost database 241. Each of the route management component 205, the vehicle location management component 220, the vehicle route control component 230, and the route cost management component 240 comprises one or more of a networked computer system, a server, or similar system configured to receive information from one or more sources, including customers, delivery vehicles 110, etc., and process the received information electronically. In some aspects, the information received from customers may be received via a computer portal or interface 210, such as a website, an internet-enabled computing device, a software application, a smartphone, or the like. In some aspects, the information received from customers may be received from electronically from a call center 215, with the customer calling into the call center 215 or showing up in person to communicate a request, where the request comprises a change in a route (i.e., an added or removed stop) for one of the delivery vehicles 110 associated with the delivery system 100.

In some aspects, the route management component 205 receives location information, such as Global Positioning System ("GPS") information and/or time information, from the delivery vehicle(s) 110 via the location management component 220. For example, the delivery vehicle 110 includes two GPS devices, one of which is considered part of the delivery vehicle 110 (e.g., the first GPS device 805, shown in FIG. 8) and the other being considered part of the driver or operator (also referred to herein as the carrier) (e.g., the second GPS device 810, shown in FIG. 8). In some embodiments, the location management component 220 receives GPS information from the two GPS devices at or of the delivery vehicle(s) 110 via one or more communication systems. The location management component 220 also preprocesses the received GPS information and appends time information to the received GPS information as needed if the received GPS information does not already include time information. In some embodiments, the location management component 220 may perform one or more of the processes described herein by implementing an algorithms. In some embodiments, the vehicle location management component 220 may store information (for example, received GPS information, etc.) in a vehicle location database 221.

In some aspects, the route management component 205 uses the GPS information received from the vehicle location management 220 (and/or any information determined from an analysis of the GPS information) to track delivery vehicles 110 and manage routes 102 of the delivery vehicles 110. Accordingly, the route management component 205 uses the vehicle route control component 230 to create new routes 102 and/or update existing routes. For example, via the route management component 205, the delivery system may track and/or monitor all routes 102 associated with the delivery system and its delivery vehicles 110. In some embodiments, the various information regarding the routes 102 is stored in the route database 221.

The route cost management component 240 may determine and/or track costs of the routes 102. Cost components of the routes 102 may be used to evaluate the routes, for example, to determine how to adjust them to make them more efficient and/or cost effective. Details of the route cost may be saved in the cost database 241.

In some embodiments, the delivery system 100 may work to make its routes 102 more efficient. For example, the delivery system may monitor efficiencies of existing routes 102, monitor efficiencies of delivery vehicles 110 and carriers on their routes 102, and determine how to improve existing routes 102, combine existing routes 102, and generate new routes 102. In some embodiments, such changes and/or improvements may be made based on an analysis of information regarding the routes 102 and based on GPS information received from delivery vehicles 110 traveling along their routes.

Details of how the GPS information from the GPS devices of the delivery vehicle 110 can be used in conjunction with existing routes 102 are described below. As noted above, GPS information (such as GPS readings) may be received from the GPS devices of the delivery vehicle 110. Details of how the delivery system 100 (and its various components and modules) use GPS data in conjunction with existing routes are provided below. The delivery system 100 may perform any or all of the processing, analysis, algorithm application, and so forth described below. In some embodiments, the delivery system 100 comprises a computing device (for example, described below with reference to FIG. 9) to perform any processing, analysis, etc., described herein. In some embodiments, one or more of the components of the delivery system 100 comprises a computing device (for example, described below with reference to FIG. 9) to perform any processing, analysis, etc., described herein.

GPS Data Smoothing

In some aspects, preprocessing the received GPS information includes or involves smoothing the location information received from the delivery vehicle 110 by the location management component 205. GPS information alone is inherently inaccurate. Accordingly, information derived from the GPS information alone, such as speed and heading values, can also be inaccurate because these values may be sensitive to successive positions reported by the GPS information. For example, small changes in the received GPS information can induce large apparent differences in speed and heading. For example, each reported GPS information (i.e., position) may have associated therewith a region of uncertainty. When GPS positions are reported with small distances therebetween, the regions of uncertainty may overlap, meaning the overall uncertainty increases. This uncertainty provides for a variability in any speed and/or heading computed based on the GPS positions, which is problematic when using GPS information to determine whether and when the delivery vehicle 110 is stopped along the route 102 at one of the stops 104a-104e and/or the heading of the delivery vehicle 110 before and/or after one of the stops 104a-104e.

Accordingly, the GPS information is smoothed to reduce the variability in the calculated speed and/or heading. In some aspects, the GPS devices of the delivery vehicle 110 may automatically perform such smoothing. However, if the GPS devices do not themselves perform smoothing of GPS position information, the location management component 220 performs the smoothing, especially if one of the GPS devices reports GPS information at a high rate (for example, 10 hertz ("Hz")) of successive GPS position readings (for example, from the first GPS device 805). In some aspects, knowledge of travel patterns for the delivery vehicle 110 inform the smoothing of the GPS data. For example, assumptions that the delivery vehicle 110 will generally not undergo "too much" acceleration or deceleration (for example, acceleration or deceleration greater than a value X) or "too rapid" change in direction (for example, greater than a value Y). Such assumptions may allow for replacement of each reported GPS location based on or with a weighted average of surrounding GPS locations. Similarly, speed and heading computations may be based on locations before and/or after the received GPS location in question. Alternatively, or additionally, more sophisticated techniques for smoothing are implemented, such as application of a Kalman filter and so forth.

The process of smoothing GPS information includes various steps, including multiple passes through the received GPS information as well as identification of start and stop times or scans, before and/or after which all received GPS information will be discarded. The start and stop times correspond to the time when the delivery vehicle 110 left a location (for example, the storage or overnight location) and returned to the location. Discarding GPS information received outside of this time range means that only GPS information obtained while the delivery vehicle 110 travelled along the route 102 is used as described herein.

The first pass smoothing of the GPS information may perform averaging of consecutive GPS readings. For example, the GPS information may be averaged according to 2k+1 consecutive GPS readings (x0, x1, x2k). Accordingly, coordinates of location k are replaced with a weighted average of surrounding locations and a tentative speed and/or heading corresponding to location k is assigned to the location k based on distances and headings of the locations x0 to x2k. Thus, in the first pass, each GPS position is replaced with a weighted average of all GPS positions with a defined radius, where the radius is a set number of GPS positions. For example, the radius may include five GPS positions. Accordingly, each received GPS position is replaced with an average of the five GPS positions before and after the received GPS position. As such, the smoothing radius, k, in this example is 5. In some aspects, the smoothing radius is set to 6 for use with the GPS device(s) of the delivery vehicle 110. Additionally, in some aspects, greater weighting is applied to nearby GPS information. In some embodiments, a value of k=6 is preferable for the GPS device(s) indicative of a position of the delivery vehicle 110. In some embodiments, the value of k may be selected to give more weight to nearby GPS readings.

In some embodiments, the first pass of smoothing performed by one of the delivery vehicle 110 or the location management component 220 is effective to remove much of the jitter from the location data. However, jitter may still exist at slow speeds or stops. To counter this jitter that occurs at slow speeds or stops, one of the delivery vehicle 110 or the location management component 220 may replace the heading at location k with a median of the headings of surrounding locations k+/−1, 2 . . . n (for example, the one or more headings for the n k values on either side of k). Additionally, the jitter at slow speeds or stops may also be countered by replacing the speed of the delivery vehicle 110 at the location k with a minimum speed of the location k and a median of the speeds at surrounding locations k+1, . . . n on either side of the location k.

Estimate Vehicle Stops

As generally known, GPS information may be used to determine a position for a vehicle when the GPS device is included in the vehicle. Similarly, GPS information can be used to determine the position of the delivery vehicle 110. However, GPS readings from the GPS devices at the delivery vehicle 110 may continue to show movement even when the delivery vehicle 110 itself is stationary. This, as noted above, may be due to the jitter received in GPS readings.

When the delivery vehicle 110 is stopped, the speed of the delivery vehicle 110 as determined based on the GPS readings may reported to be very small or null (depending on the GPS devices and the GPS logging software). Similarly, while the delivery vehicle 110 is stopped, the heading of the delivery vehicle 110 (as based on the GPS readings) may also be reported as null or being very small. In some embodiments, the speed and the heading may vary considerably.

Thus, to identify stops of the delivery vehicle 110, the GPS readings from the delivery vehicle 110 may be analyzed according to the following sequence. First, the stream of GPS readings from the delivery vehicle 110 is analyzed to identify a subset of sequential GPS readings during which the velocity of the delivery vehicle 110 is indicated as being sufficiently small. The "sufficiently small" velocity may be selectively established as needed dependent upon an accuracy or precision required in the stop determination and the frequency of readings from the GPS devices of the delivery vehicle 110. For example, a reasonable "sufficiently small" value is 1.5 meters/second. For GPS devices of the delivery vehicle 110 that record GPS readings at a very high frequency, the desired subsequence should extend for at least a half-second, or some length of time that is slightly less than the length of the shortest imaginable stop, considering that the driver of the delivery vehicle 110 presumably must move his or her foot from the brake to the accelerator.

Additionally, subsequences of GPS readings indicating the sufficiently small velocity may be interpreted as stops of the delivery vehicle 110. Even though the speed of the subsequences may be reported to be very small or null, the GPS readings will have different latitudes and longitudes. Thus, for each such subsequence of GPS readings, a stop can be determined based on the average latitude, longitude, and heading of the subsequence of GPS readings having the sufficiently small velocity. For the determined stop, a time of arrival is interpreted to be the time of the earliest GPS reading in the subsequence minus one-half the standard time between GPS readings and the time of departure from the determined stop is the time of the latest GPS reading in the subsequence plus one-half the standard time between GPS readings.

Furthermore, stops that are sufficiently close in time or physical space, when reviewed or analyzed in chronological order, may be combined into a single stop. For example, if two presumed stops are separated by no more than 2 seconds or less than a couple feet, the two stops may be determined to represent a single, longer stop that begins with the arrival time of the first stop and ends with the departure time of the second stop. For these "combined" stops, the location, speed, and heading of the "combined" stop are each computed as weighted averages of the location, speed, and heading, respectively, of the contributing stops, with the weights being proportional to the respective durations. Finally, stops that are implausibly short (for example, less than 1 second) are filtered out.

Figure 3:
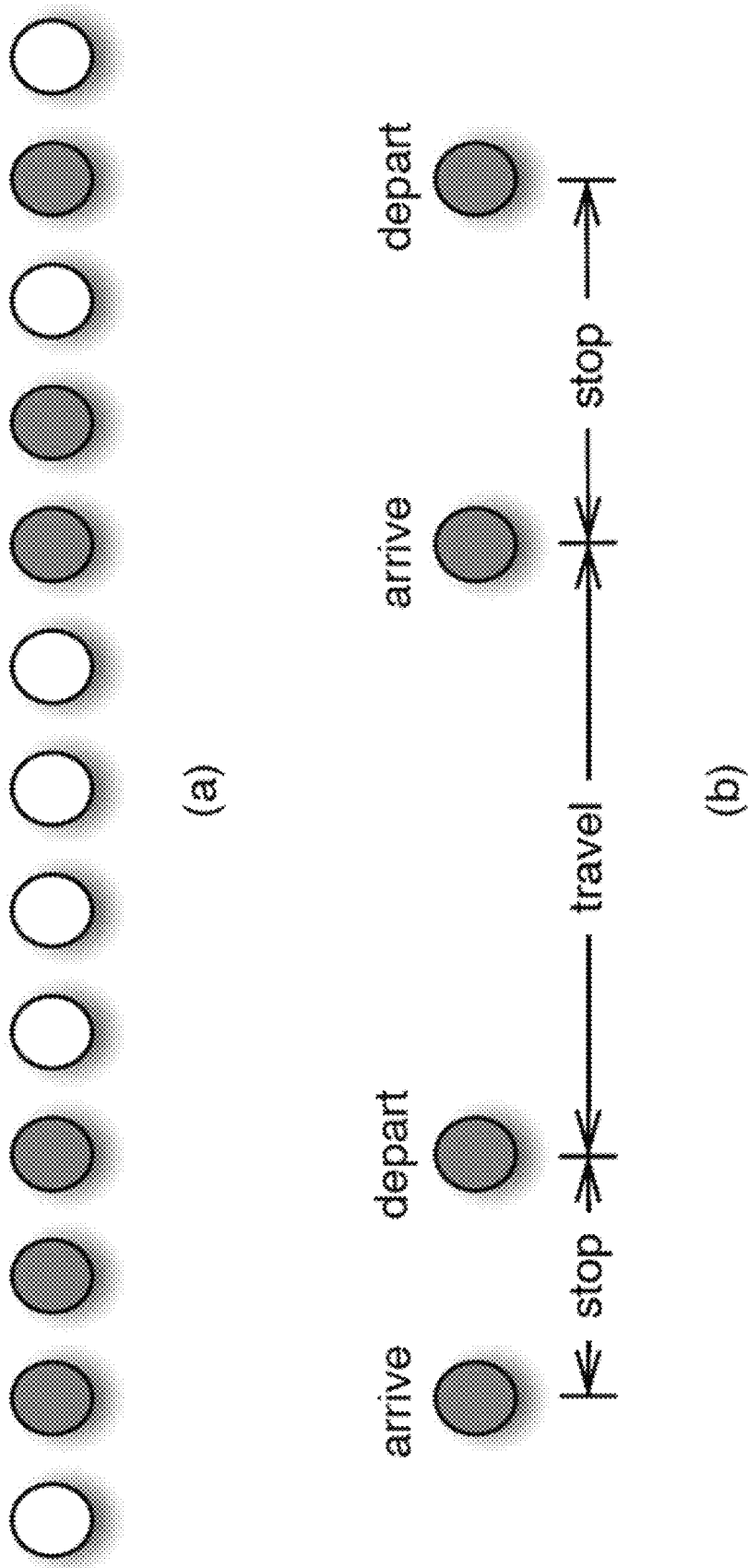
FIG. 3 is a diagram depicting an example of determining stops based on parameters of GPS readings.

FIG. 3 is a diagram depicting an example of determining stops based on parameters of GPS readings. The top part (a) of the diagram shows the plurality of GPS readings received from one or both of the GPS devices. The position of the circles does not necessarily indicate relative location, but are arranged chronologically, based on the time the readings were taken. The circles represent the GPS readings and are equally spaced to represent the relative frequency at which the readings are made and received. The shaded circles indicate GPS readings determined to be associated with a stop while unshaded circles represent GPS readings received while the delivery vehicle 110 is engaged in an activity other than at a delivery point, such as moving, stopped in traffic, stopped for a break, moving on foot, and the like. The depicted sequence of circles includes a first unshaded circle, three shaded circles, four unshaded circles, two shaded circles, and three circles that alternate from unshaded to shaded to unshaded. The bottom part (b) of the diagram shows how the shaded circles from the top part (a) of the diagram are interpreted to be times when the delivery vehicle 110 is either stopped or when it is traveling between stops. In some embodiments, the system determines that the third, moving stop among the 4 circles in part (a) may not deviate from a particular location, or may be within a given distance from one or more of the other circles, such that the 4 consecutive GPS readings are determined to be a single stop.

As shown, the shaded circles in the top part (a) are interpreted to be associated with two stops. By comparing the top part (a) and the bottom part (b), a first sequence of sequential shaded circles identifies a first stop, a sequence of multiple unshaded circles represents the delivery vehicle 110 moving, and a second stop is identified where three out of four sequential circles are shaded. Although one of the GPS readings may indicate movement, the system can determine that where 3 of 4 consecutive readings indicate a stop. In some embodiments, other fractions or ratios can be used to determine a stop. Thus, the bottom part (b) includes a first shaded circle determined to be when the delivery vehicle 110 arrives at the first stop, a second shaded circle determined to be when the delivery vehicle 110 departs the first stop, a period of when the delivery vehicle 110 travels from the first stop to the second stop, a third shaded circle determined to be when the delivery vehicle 110 arrives at the second stop, and a fourth shaded circle determined to be when the delivery vehicle 110 departs the second stop. The determined arrival and departure points for the bottom part (b) align with the corresponding shaded circles in the top part (a).

The resulting list of GPS stops may include unplanned stops, for example stops induced by traffic. However, the resulting list of GPS stops may also omit some planned stops, such as those that are sufficiently close together that an analysis of the GPS readings from the delivery vehicle 110 is unable to distinguish between the planned stops. Accordingly, additional analysis of the GPS readings may be used to distinguish between GPS stops that include two or more planned stops and those GPS stops that are merely longer than others or average.

Reconciling Data from Two GPS Devices

In some embodiments, each delivery vehicle 110 includes two GPS devices that provide GPS readings, as described above. For example, some hardware integrated into the delivery vehicle 110 may send a first GPS signal from a first GPS device 805, and a mobile delivery device (MDD) having the second GPS device 810 can send a second GPS signal. Both of these devices may independently transmit GPS readings to one of a controller in the delivery vehicle 110 or the location management component 220. Accordingly, stops may be duplicated if the GPS readings from both of the GPS devices from the same delivery vehicle 110 are analyzed, especially because, in general, the two GPS devices will not agree precisely with respect to the locations (i.e., the longitude and latitude) of stops nor on the start or end times of the stops. Below is provided a method for reconciling stops that are independently identified from the readings of the two GPS devices but that actually refer to or represent the same stop.

When the delivery system 100 analyzes the GPS readings received from the two GPS devices of the delivery vehicle 110, the delivery system 100 gives priority to time information for the GPS readings over location information, as the time information is generally more accurate that the location information. Furthermore, if analysis of the first GPS information from one of the GPS devices indicates a stop occurred and provides details of the stop, then the delivery system determines that the stop occurred even if not supported by GPS readings from both GPS devices (e.g., the second GPS information from the second GPS device conflicts with the first GPS information). In some embodiments, if the two GPS devices are in irreconcilable disagreement, the delivery system 100 gives priority to the second GPS device (of the carrier/operator) over the first GPS device 805 of the delivery vehicle 110, because the carrier may interact with the second GPS device 810 more than the first GPS device 805. Furthermore, the first GPS device 805 may be more vulnerable to disruption, therefore making the readings from the first GPS device 805 less reliable than the second GPS device 810. When both GPS devices identify stops at generally relative times and positions, the corresponding times and positions may be averaged because the average of the two stops is guaranteed to be more accurate in time and location than just the GPS readings from a single stop.

Figure 4:
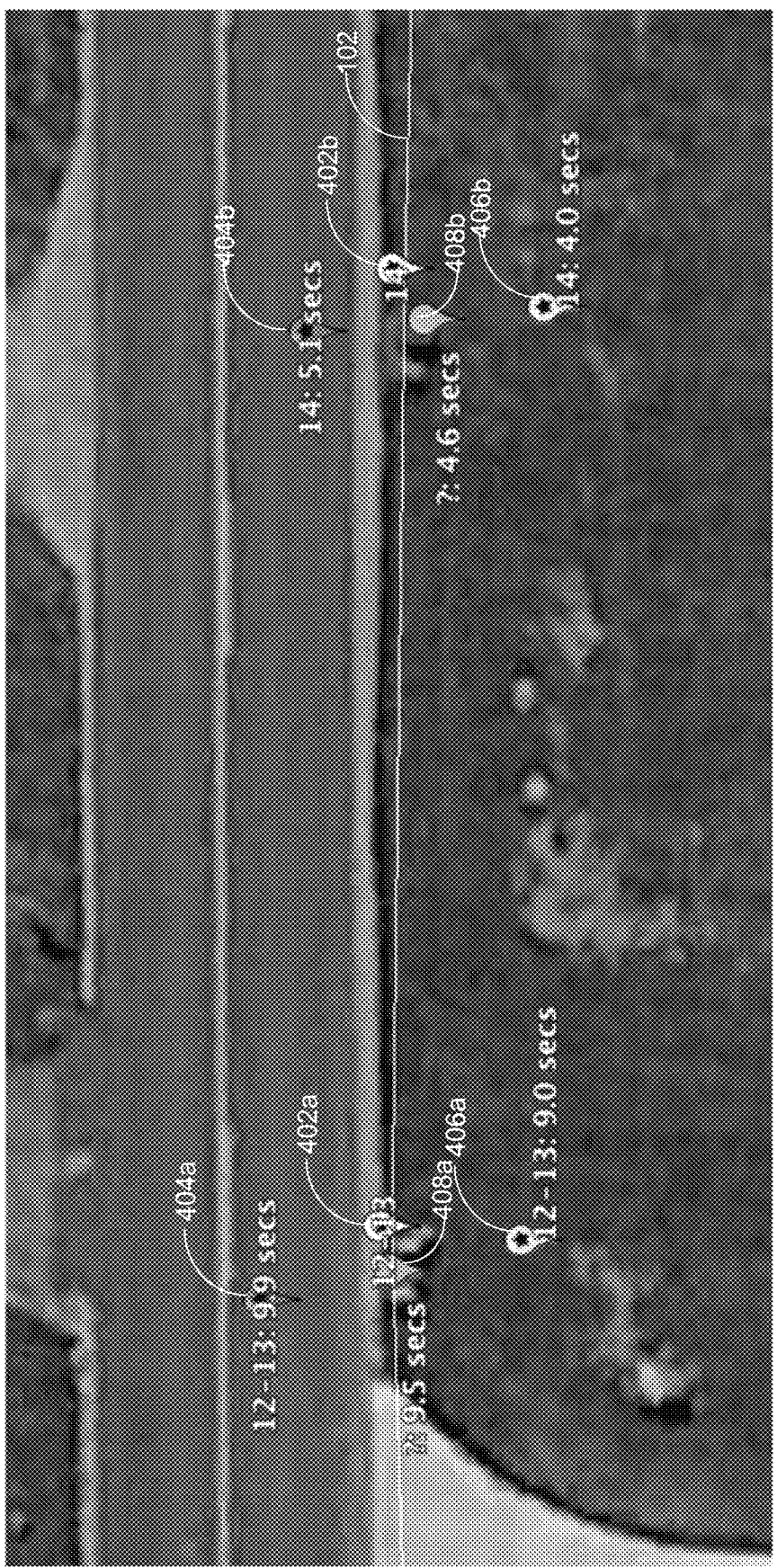
FIG. 4 is a map showing a route 102 along a road with route stops, GPS locations from two GPS devices, and consensus stops shown.

FIG. 4 is a map showing a route 102 along a road with route stops, GPS locations from two GPS devices, and consensus stops shown. The map shows a line representing the route 102 with pins 402a and 402b that fall on the line. The line represents the route 102 while the pins 402a and 402b that fall on the line represent expected stops along the route 102. Two pins 404a and 404b shown on the road surface pertain to those GPS readings received from the first GPS device 805 of the delivery vehicle 110 while the pins 406a and 406b found in the grass away from the road represent those GPS readings received from the second GPS device 810. The fourth set of pins 408a and 408b that fall close to but not on the line representing the route 102 represent the consensus stops developed based on the average of the pins 404a and 404b from the first GPS device 805 and pins 406a and 406b from the second GPS device 810. For example, the location of the pin 408a is determined based on averaging the pin 404a from the first GPS device 805 and the pin 406a from the second GPS device 810, and the location of the pin 408b is determined based on averaging the pin 404b with the pin 406b. In this instance, the average (e.g., pins 208a and 208b) of the pins from the two GPS devices is more accurate than either GPS device individually. In general, the average is expected to be more accurate than the GPS devices individually and is guaranteed to be more accurate than the less accurate of the two GPS devices.

When one stop identified from the GPS readings of one of the GPS devices overlaps another stop identified from the GPS readings of the other of the GPS devices in time, the two stops may be combined and/or considered as being the same stop. If more than two stops overlap, all of the overlapping stops may be combined and/or considered as the same stop. For example, a set S of stops overlap if, for any two stops s1 and sn in the set, there is a sequence of stops in S where s1 overlaps s2, s2 overlaps s3, and so on, until sn-1 overlaps sn. If these conditions are met, then the set S of stops is combined and/or considered as a single stop. As such, not all of the stops in the set S must overlap all the other stops. Instead, for each stop in the set S, each stop must overlap at least one other stop in the set S. The GPS readings from the GPS devices may be considered such that such a sequence of stops S is maximized, meaning that all potential stops are added to the sequence of stops S without invalidating the sequential, paired overlapping requirement described above. In some embodiments, the overlapping set S consists of two subsets, one comprising the stops identified by one of the GPS devices and the other comprising the stops identified by the second of the GPS devices. In some embodiments, no pair of stops in each respective subset overlap. However, if both subsets are non-empty, each stop of the first subset may overlap at least one stop of the second subset, and vice versa. The process described above identifies maximal overlapping sets of stops and builds a single consensus stop from each, as illustrated in FIG. 5.

Figure 5:
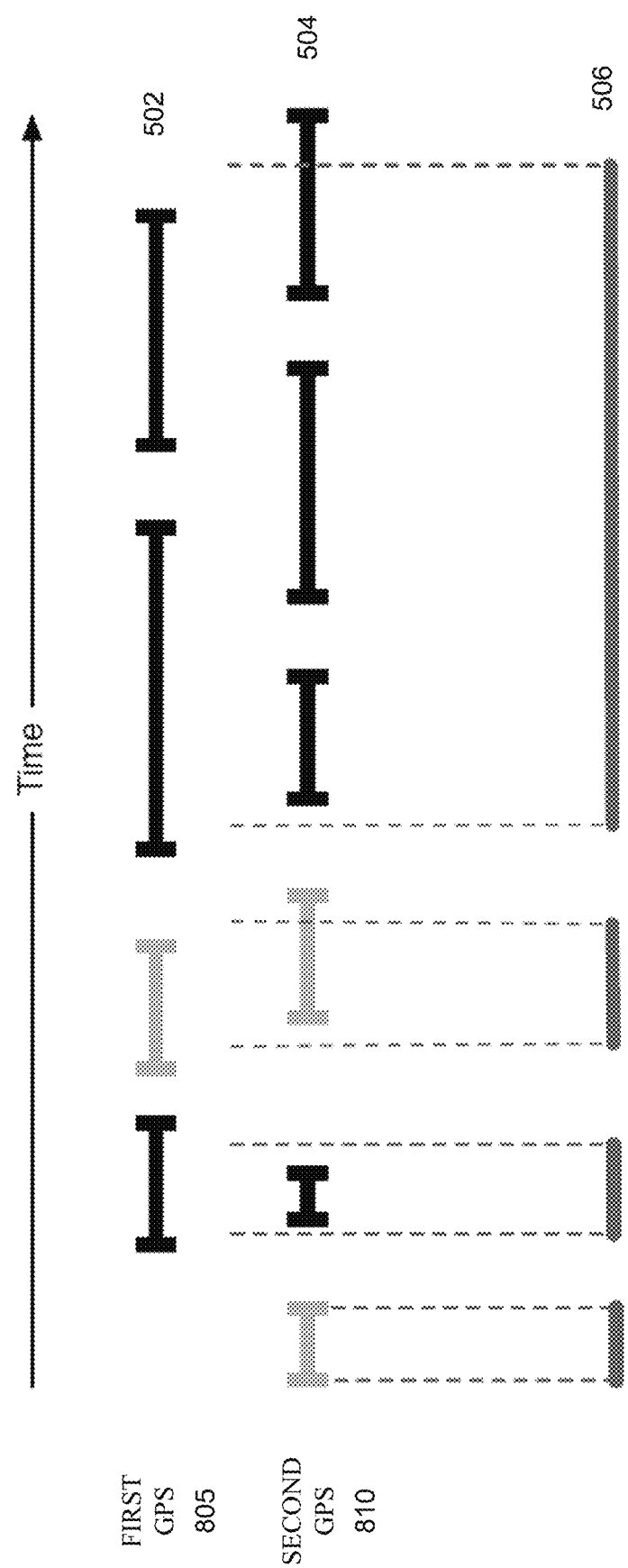
FIG. 5 is a diagram showing how overlapping sets of stops generate a consensus stop.

FIG. 5 is a diagram showing how the delivery system 100 can combine overlapping sets of stops from data from the two GPS devices to generate a consensus stop. The diagram shows that, as time passes, GPS stops reported by the first GPS device 805 (top set of lines 502) and GPS stops reported by the second GPS device 810 (middle set of lines 504) can be reconciled (for example, determined to be a common stop or overlapping, if applicable). The bottom set of lines 504 shows a proposed reconciliation for the GPS stops from the first and second GPS devices 805 and 810, respectively. In each case, a common stop is constructed from a maximal set of stops that are connected by overlapping in time. Each common stop is determined by averaging the earliest arrival times from each GPS device 805 and 810, and the latest departure times from each GPS device, and the latitudes and the longitudes of stops used to build each common stop.

Various algorithms may be implemented to maximize overlapping sets of stops. In an exemplary algorithm, the delivery system 100 identifies an initial stop for the set of overlapping stops, as determined from readings from either GPS device having the earliest arrival time, for example from the GPS device 805. The delivery system 100 then monitors the second GPS device 810 to determine whether its readings identify another stop that overlaps with the initial stop. If the stops do not overlap, then the initial stop becomes a consensus stop by itself. If the stops do overlap, then the delivery system joins the initial stop and the stop identified from the second GPS device 810 that the delivery system can eventually merge into a single stop comprising the overlapping set of stops.

The delivery system 100 may implement the exemplary algorithm, which traverses the GPS readings received from each GPS device (for example, in the format of input arrays). The algorithm identifies, based on the GPS readings, the next stop from each GPS device and tests whether the next stop(s) should be included in the set of overlapping stops that is being constructed by checking the overlapping status. For example, if the next stop identified by the second GPS device 810 overlaps the last stop identified by the first GPS device 805 in the current set, the next stop identified by the second GPS device 810 is appended to the second GPS device 810 part (e.g., the line 504) of the current set, and the algorithm advances to the next stop identified by the second GPS device 810 and the process continues. Alternatively, if the stop identified by the first GPS device 805 overlaps the last stop identified by the second GPS device 805 in the current set, the stop is appended to the first GPS device 805 part (e.g., the line 502) of the current set, and the algorithm advances to the next stop identified by the first GPS device 805 and the process continues. Alternatively, when no stop identified by either GPS device overlaps the last stop identified by the other GPS device, the current set is at its maximum size and its member stops are combined into a single stop and the algorithm begins building a new set of overlapping stops.

When starting a new set of overlapping stops, the delivery system 100 may use the algorithm to determine whether the next stop from the first GPS device 805 overlaps the next stop from the second GPS device 810 (or vice versa) and, if so, place them in their corresponding subsets in the new set (represented by the line 506) and continue as described above. If the next stops do not overlap, then the algorithm may clone the stop from the GPS device having the earliest arrival time and advance to the next stop from either GPS device and continue as described above.

A consensus stop is a stop that represents a single stop for one or more combined stops as identified from GPS readings from the GPS devices. A consensus stop is constructed from a set S of one or more overlapping stops according to the following exemplary algorithm. First, the consensus algorithm determines whether one of the first GPS device subset or the second GPS device subset of stops is empty. If so, then the other subset of stops has only a single stop that does not overlap any other stop, and that single stop is returned or deemed a consensus stop for that set S of stops. Otherwise, the consensus algorithm determines a latitude of the consensus stop based on a weighted average of the latitudes of all stops in the set S of overlapping stops and determines a longitude of the consensus stop based on a weighted average of the longitudes of all stops in the set S of overlapping stops, where the weight of each latitude/longitude is the duration of each respective stop. Additionally, the consensus algorithm establishes a minimum arrival time of all stops in each of the subsets of stops from the first and second GPS devices and sets an arrival time of the consensus stop to be the average of these minimum arrival times. Similarly, the consensus algorithm establishes a maximum departure time of the consensus stop to be the average of the maximum departure times from all of the stops from each of the subsets of stops from the first GPS device and the second GPS device.

In some embodiments, the stops identified in the list of consensus stops (for example, represented by the line 506) better matches the route 102 of the delivery vehicle 110 than either the first GPS device stops or the second GPS device stops alone. Furthermore, the consensus stops may, on average, be closer to the stops along the route than the stops from either the first GPS device or the second GPS device (for example, second GPS device stops were on average 3.2 meters from their match on the route 102, first GPS device stops were 3.7 meters from their match on the route 102, and the consensus stops were 2.6 meters from their match on the route 102).

Based on the algorithms described above, the locations identified by the consensus stops are generally more accurate than the stops identified by the first GPS device 805 and/or the second GPS device 810 alone. Furthermore, the consensus stops are generally appropriate stops as compared to the scheduled route 102 when one of the two GPS devices is malfunctioning. Furthermore, the consensus algorithm automatically accounts for when the carrier leaves the delivery vehicle 110.

A consensus stop that averages others will probably be more accurate than either device individually; but it is guaranteed to be more accurate only in comparison to the less accurate device. If one device is wildly inaccurate, that will distort the average and damage the accuracy of the consensus stop.

When the carrier is performing a stop at a direct distribution delivery (DDD) point, the MDD may generate a series of stops that move away from the stopped delivery vehicle 110 (and the first GPS device 805). Averaging the locations will place the average stop away from the delivery vehicle 805. This is ameliorated to some extent by using the delivery system 100 to compute a weighted average of the locations, where the weight is the duration of the stop. This will give extra weight to the stop identified by the first GPS 805.

Sometimes, during a dismount, the carrier returns to the delivery vehicle 110 and drives off so quickly that the MDD (and the second GPS device 810) does not register a final stop before departure. Therefore the last stop identified by the MDD data (from the second GPS device 810) will have ended earlier than the stop identified from the first GPS device 805 and averaging will make the average stop appear shorter than the stop actual was.

Sometimes there is a significant difference in the clocks of the MDD (e.g., the second GPS device 810) and an XGPS (e.g., the first GPS device 805). In such a case, overlaps in time may not be accurate and trustable. This can best be resolved by programming the MDD to check synchronization with the XGPS clock and either report any discrepancy or else repair it.

GPS malfunctions can sometimes create unusually long but false stops that overlap and hide actual stops. For example, on a particular route, shortly after arriving at a mail stop the XGPS quit working for three hours. As a result, a significant portion of a remainder of the XGPS information appeared as one very long stop that overlapped many subsequent stops identified by the MDD and the second GPS device 810. The consensus stops generated by the delivery system 100 inherit such errors. In this case, the delivery system 100 could identify an error because the MDD recorded 363 stops while the XGPS saw only 27. Because the last XGPS "stop" lasted for the remainder of the trip, there were only 27 consensus stops. The delivery system 100 may ameliorate such errors by disregarding any day for which the number of stops reported by both the MDD and XGPS are not reasonably close to the number of expected stops on the route 102.

Additionally, the delivery system 100 may identify when the carrier leaves the delivery vehicle 110 by checking whether, in a set of overlapping GPS stops, all the MDD stops (e.g., from the second GPS device 810) are contained within one XGPS (e.g., from the first GPS device 805) stop.

Matching GPS Stops with Route Stops

The delivery system 100 may match GPS stops with route stops as discussed herein. In determining whether to adjust and/or how to adjust existing routes, such as the route 102, the delivery system 100 matches identified and/or tracked stops based on the GPS readings from the GPS devices of the delivery vehicle 110 to stops along the route 102. Stops identified by the GPS readings that are matched with expected stops on the route 102 then become planned stops while those that are not associated with expected stops are unplanned stops. The delivery system 100 may match a stop identified based on the GPS readings with an identity (including, for example, a type, a location, a reason, a work-content model, etc.) of a planned stop along the route 102 when the delivery system 100 matches the stop to one of the planned stops.

Since the route 102 is a sequence of expected stops P={p1,p2, . . . , pm}, the delivery system 100 may assume that the route 102 and details regarding the sequence of expected stops are accurate with regard to locations, sequence, and timing. Based on the GPS readings, and as described above, another sequence of locations Q={q1, q2 . . . qn} is determined at which the delivery vehicle 110 and/or the carrier appears to have stopped (for example, the locations corresponding to the listing of consensus stops identified above). The sequence of consensus stops Q may differ from the expected sequence P in several ways.

First, the reported locations in the sequence Q may not be identical to those of the sequence P, for example due to the inherent inaccuracy of the GPS readings, etc., due to inaccuracies in the expected locations P in the route 102 description, or due to the delivery vehicle 110 not stopping sufficiently close to the expected location, such as when the desired location is blocked by another vehicle or other object. Second, the sequence Q may omit some locations identified in the sequence P because the delivery vehicle 110 did not stop at the expected location (for example, at traffic lights identified in the sequence P that were green, at a delivery only mailbox that received no mail that day, etc.). Finally, the sequence Q may include locations that do not appear in the sequence P (for example, caused by the delivery vehicle 110 stopping for a pedestrian, due to construction that causes delays, traffic, etc.).

In performing the analyses described herein, the delivery system 100 expects that the delivery vehicle 110 respects the sequence of planned stops identified in the sequence P. That is, the delivery vehicle 110 may stop at unforeseen places and may skip some stops, but if location A appears on the route 102 before location B, then the delivery vehicle 110 will visit location A before visiting location B.

The algorithm to match GPS stops (for example, those in the sequence Q) with the expected stops (for example, those in the sequence P), as implemented by the delivery system 100 may proceed in a piece-meal manner. For example, to compare the similarities and/or differences between each sequence, the delivery system 100 may compare individual pieces of each sequence in a corresponding fashion. For example, the delivery system 100 may match each stop of the expected stop (or attempted to be matched) with a corresponding GPS stop for all expected stops along the route 102.

Assuming that the first i-1 stops of the sequence Q are determined to correspond to the first j-1 stops of the sequence P, determining whether the qi and the pj stops match involves (for example, a matching algorithm) making one of the following determinations:

Determine that the GPS stop qi matches with the expected stop pj;

Determine that the GPS stop qi was unplanned; and

Determine that the expected stop pj was skipped for some reason.

A computational cost or impact (generally described as a "cost" herein) is assigned to each of these determinations and used (for example, based on a dynamic programming recursion applied by the delivery system 100) to identify a minimum-cost correspondence between matching GPS stops with expected stops. The respective costs may correspond to computational costs or impacts of using or ignoring information regarding GPS and route stops. For example, the dynamic programming recursion expresses the fact that the best correspondence between GPS stops and expected stops minimizes the total of the cost (or impact) of a current determination plus a least cost correspondence of the remainder of the stops.

More formally, let f(ij) be the minimum cost of matching subsequence {q1, . . . , qi} with {p1, . . . , pj}. Then $$f(i, j) = \min \begin{cases} \text{cost of identify } q_i \text{ with } p_j & + f(i-1, j-1) \\ \text{cost of ignoring } q_i & + f(i-1, j) \\ \text{cost of ignoring } p_j & + f(i, j-1) \end{cases} \quad \text{(Equation \#1)}$$

The best set of matches generates the value f(n,m). The computation requires progressively filling an (m+1)×(n+1) matrix of the costs f(i,j) and then working backwards to identify the correspondence. The total computation and space are both O(mn). This approach uses knowledge of how the sequence Q will follow, at least approximately, the expected sequence P. This approach also enables very fast computation of the most likely matches and also prevents errors from propagating between computations. Even if the delivery vehicle 110 goes out of sequence for part of the route 102, the algorithm will resume matching appropriately as soon as the carrier resumes the correct sequence.

The decision-making by the matching algorithm is driven by the relative costs or computational impact (for example, impact that such a decision has on further processing) of declaring a match between the GPS stop and the expected stop versus declaring the GPS stop to be unplanned versus declaring the expected stop to have been skipped.

The costs assigned to matches represent a relative "believability" of the match to which the score is assigned. A small value cost represents that the match is probably accurate (and therefore may have a small or minimal computation impact) while a high value cost suggests the match is less accurate (and therefore may have a larger computation impact than the small value cost). In general, greater knowledge of the expected stops provides for better assessment of the likelihood of a match between GPS stops and expected stops. In some embodiments, where information from the GPS devices is used in evaluating costs, the GPS information from the first and second GPS devices may be averaged. Alternatively, where one GPS device is known to be more accurate than the other, the less accurate information may be ignored and the costs may be determined or evaluated based on the more accurate GPS device alone.

In general, the overall matching cost involves aggregating costs associated with distance, heading, and any other relative factors. In some embodiments, one way to aggregate these costs is to sum them. In some embodiments, the distance costs, which are computed from latitudes and longitudes, is the only cost that is guaranteed to be available. In some embodiments, missing data will not incur a cost from the matching algorithm. For example, if a GPS stop being matched to a mail stop has no heading associated with it, there should be no penalty assessed in the corresponding cost determination.

Proximity Distance Costs

Figure 6A:
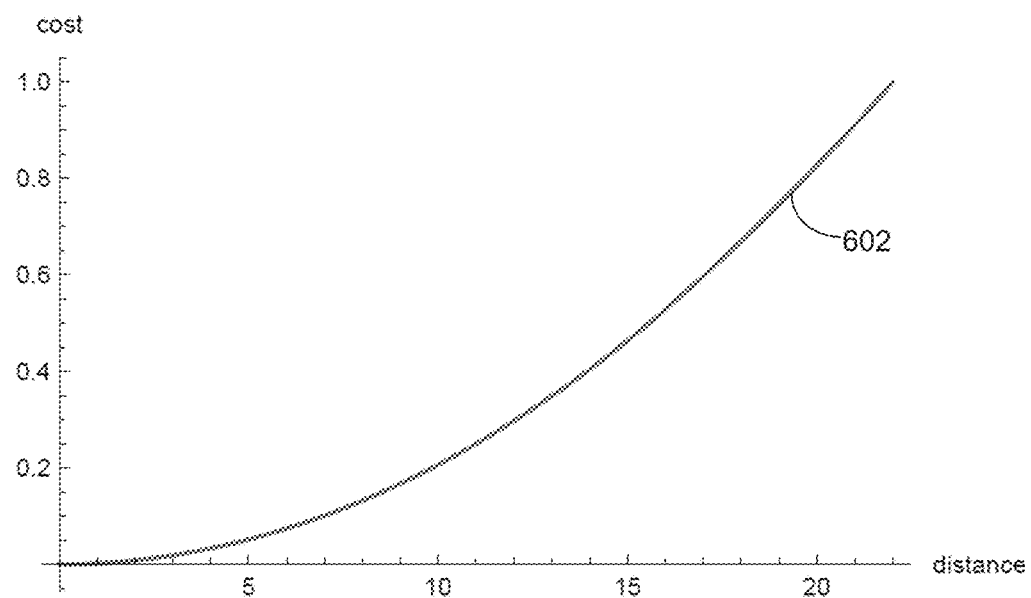
FIG. 6A is a graph showing the relationship of distance to cost of matching a GPS stop to an expected stop.

The delivery system 100 may determine proximity distance costs as discussed herein, where the proximity distance costs represent a computational impact of the proximity distance. Because of limitations on data availability, the delivery system 100 may currently measure the quality of a match between a GPS stop and an expected stop by a distance between the location information associated with each. The cost of a match decreases with the distance between the locations, which reflects the likelihood of the match, as shown in FIG. 6A, described more below. The distance between the GPS stop and the expected stop is compared to a proximity distance, which may be set at a value corresponding to a highest accuracy range for a consumer-grade GPS device. For example, the proximity distance may be set to 22.0 meters. Based on this, the cost of the distance is determined based on $$\text{cost} = \left(\frac{\text{distance in meters}}{22.0}\right)^2 \quad \text{(Equation \#2)}$$

FIG. 6A is a graph showing the relationship of distance to cost of matching a GPS stop to an expected stop. The graph shows distance along the x-axis and cost along the y-axis. The graph shows via line 602 that, as the distance increases, the cost increases at a non-linear rate. As shown, the cost (e.g., the computational impact) increases quickly once the distance exceeds the proximity cost threshold, for example set to 22.0 meters. As shown, the cost of matching a GPS Stop to an expected stop increases rapidly when the distance between them exceeds 22 meters.

In some embodiments, the delivery vehicle 110 cannot be certain to stop at the same exact location during different instances of the route 102 (for example, on different days), specifically for traffic control points or stops. For example, in a high traffic or density area, queues at traffic lights, signs, or other control points may vary day by day. Accordingly, the delivery vehicle 110 may stop at different locations or a different number of times for each traffic control point on the different days. For example, for a quick traffic light, the delivery vehicle 110 may first stop 30 meters away from the traffic light, resume travel when the traffic light has changed, and then again stop 5 meters away from the traffic light before finally resuming travel and passing the traffic light. Similar occurrences can be expected for various types of traffic signals (for example, traffic lights, railroad crossings, school crossings, drawbridges, stop signs, etc.). In such instances, the distance penalty may be reduced between GPS stops and expected stops. Accordingly, when the expected stop is a traffic control point that is determined to be variable day-by-day, the distance between the GPS stop and the expected stop locations is first divided by a deflation factor (for example, set to 2.0), which has an effect of doubling an area or distance within which a match can be declared. Thus, the cost of the distance matching is adjusted to compensate for traffic control point variations.

Proximity Heading Costs

The delivery system 100 may determine proximity heading costs as discussed herein, where the proximity heading costs represent a computational impact of the proximity distance. In some embodiments, expected stops along the route 102 have headings associated with them. For example, curbside mailboxes have associated headings that would be expected of any vehicle stopped at that location. The heading inferred from the GPS stop is compared with the heading at the expected stop. However, when the stop has no well-defined heading, no heading may be provided for that stop and no cost will be assigned to any corresponding heading difference. Generally, headings of stops are derived values and may be less reliable than measured latitudes and longitudes. Accordingly, differences between the GPS stop headings and the expected stop headings are not penalized as much as the distances between the stops, described above. The heading difference between the GPS stop and the expected stop is first determined. When the heading difference is a positive value in the range [0,180), the heading cost is determined based on $$\text{cost} = \left(\frac{\text{difference in heading}}{130.0}\right)^2 \quad \text{(Equation \#3)}$$

Figure 6B:
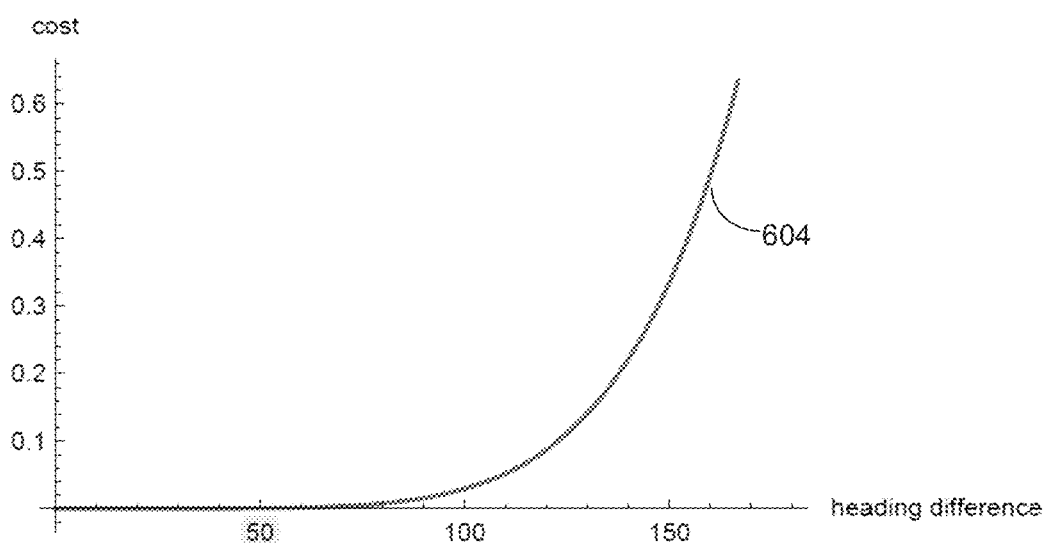
FIG. 6B is a graph showing the relationship of difference in heading to cost of matching a GPS stop to an expected stop.

FIG. 6B is a graph showing the relationship of difference in heading to cost of matching a GPS stop to an expected stop. The graph shows a heading difference (in degrees) along the x-axis and cost along the y-axis. The line 604 on the graph shows that, as the heading difference increases, the cost increases at a non-linear rate. As shown, the cost increases more quickly once the heading difference exceeds approximately 120-degrees as compared to heading differences of less than approximately 120-degrees.

Incorporating Other Information

Accurate scoring distinctions by the delivery system 100 based on matching algorithm may utilize matching costs that are extended or specialized to include other information about the expected stop. For example, in the expected stops, additional information about an expected duration of the stop may be known. For example, if a particular expected stop is a mail stop that serves many addresses, the duration of the expected stop is expected to be longer. Accordingly, the matching algorithm may utilize models or computations that penalize a match if a duration of the corresponding GPS stop is much shorter than the expected duration.

The default model or computation assigns a constant 4.0 as a shortest time required for a dismount by the driver of the delivery vehicle 110. In some embodiments, a dismount is expected at any mailstop that is not indicated in the predicted stop information as being a curbside stop or as particular traffic control points. Similarly, a constant of 1.0 is assigned as a shortest time required to serve an address without dismounting the delivery vehicle 110. Accordingly, a lower bound on service time can be estimated by multiplying the number of stops served at the stop times 1.0 by 1.0 and adding this amount to any dismount times, determined by multiplying the number of stops served at the stop times 4.0 by 4.0. One way to penalize mismatches is to compute the ratio of the lower bound on expected stop times (dismount time plus service time) divided by an observed time of the stop. The cost of accepting this match is the ratio if the ratio exceeds 1.5, and zero otherwise. Such conditions will prevent the matching algorithms from matching GPS stops of brief duration to expected stops that are expected to require more time (for example, longer durations).

Costs of Unplanned Stops

Unexpected stops will be identified by the delivery system 100 based on the GPS readings, especially when the delivery vehicle 110 travels on busy roads. The costs of unplanned stops relate to computational impacts that the unplanned stop matching or not matching with an expected stop has on further processing. Therefore, the cost of ignoring a GPS stop that does not match well with one of the expected stops of the sequence of expected stops along the route 102 should be smaller than the cost of skipping an expected stop. In some embodiments, the cost of an unexpected stop is set to 0.9, or a smaller value. In some embodiments, the on a segment of the route 102 that is known or expected to have dense traffic and which is, accordingly, expected to result in more unplanned stops.

Costs of Skipping Expected Stops

In general, the cost to skip an unplanned stop is 1.0. The costs of skipping expected stops relate to computational impacts skipping the expected stop has on further processing. However, this cost may be reduced for a planned stop that might not be required, such as at a stop light. In addition, there are some stops that are almost certain to be visited, such as a stop at a mail collection box. To account for these variations, the costs for skipping expected stops may be established according to Table 1.

TABLE 1

| TYPE | SUBTYPE | PENALTY |
|------|---------|---------|
| TCP  | YLD, FS, DR, RR, SZ | 0.0 |
|      | TL | 0.3 |
|      | SS | 0.5 |
|      | TR, AG | 0.6 |
|      | CB | 3.0 |
|      | ELSE: | 1.0 |
| MS   | B, C, H | 3.0 |
|      | ELSE | NUMBER OF ADDRESSES X 1.0 |
| ELSE |  | 1.0 |

Additionally, the matching algorithm may assign costs of skipping an aggregate stop equal to a sum of the costs of skipping each individual stop within the aggregate stop. Thus, if a planned stop serves ten addresses, the cost of leaving this stop unmatched is ten times the cost of leaving unmatched a stop that serves a single address.

The matching algorithm described herein (as applied by the delivery system 100) will operate appropriately even if the delivery vehicle 110 violates the expected sequence of stops, as long as the violation is not extreme (for example, as long as the delivery vehicle does not change the sequence in a manner such as reversing the entire route 102). Thus, for example, if the route 102 presents stops in the sequence A-B-C-D but the delivery vehicle 110 visits the stops in the sequence A-C-B-D, the matching algorithm will report either A-C-D or else A-B-D, depending on whether C or B is a better match to the corresponding GPS stop, identifying the missing stop as being a skipped stop and identifying the travel time from A to C or from B to D, respectively, as being unusually long. Presumably, the missed stop will be an outlier in the data and, therefore be recognizable. Similarly, if the delivery vehicle 110 deviates, say to complete an express delivery, after visiting locations A-B and then returns to visit C-D, the only effect will be that the travel time from B to C will appear unusually large. Besides being an outlier, this reading would be ignored anyway because the travel from B to C would appear to have been interrupted by one or more unplanned stops.

Estimating Segment Transition Times

After the matching algorithm matches the GPS stops to the expected stops along the route 102, an estimating algorithm (as may be applied by the delivery system 100) searches the list of GPS stops to find the last matched stop on the current segment i (for example, a matched stopj) and assume the delivery vehicle 110 departed the location of the stopj location at a time tj. The estimating algorithm then searches forward in the list of GPS stops to find the next matched stop stopj+1. The stop stopj+1 will appear on a different segment k. Assume that the delivery vehicle 110 arrived at the stop stopj+1 at a time tj+1. Sometime within the interval [tj,tj+1], the delivery vehicle 110 must have exited segment i and any segments between i and k before entering the segment k. Next, the GPS readings from the delivery vehicle 110 GPS devices, which are time-stamped, are searched within the interval [tj,tj+1] to find those GPS readings that are closest to the endpoints of the segment i and the segments between segments i and k, subject to the condition that the reported heading of the last GPS stop be within 90 degrees of the heading associated with the endpoint of the segment.

For example, the estimating algorithm may assume that each of the segments i,i+1, . . . , k−1 (for example, each of the segments between segment i and segment k not including k) has a distinct GPS reading that is the current incumbent for the closest GPS reading to the end point of the respective segment. Because the delivery vehicle 110 is assumed to travel segment i before segment i+1, the estimating algorithm may determine that the timestamp of the GPS reading that is closest to segment i be no later than the timestamp of the GPS reading that is closest to segment i+1. Similarly, the timestamp of the GPS reading that is closest to segment i+1 cannot be later than the timestamp of the GPS reading that is closest to segment i+2. Now if the next GPS reading is closer to the end point of segment i than the current incumbent GPS reading, then the next GPS reading becomes the incumbent GPS reading for segment i and all subsequent segments i+1, . . . , k−1. If the next GPS reading is closer to the end point of segment i than the current incumbent, then it becomes the incumbent for segment i and all subsequent segments i+k−1. Otherwise, the estimating algorithm checks whether the GPS reading is closer to the end point of segment i+1 than the current incumbent and of acceptable heading. If so, the checked GPS reading is set as the new incumbent for downstream segments i+2, . . . , k−1. Otherwise, the estimating algorithm checks whether the checked GPS reading is closer to the end point of segment i+2 than the current incumbent, and so on.

Estimating times associated with the segment transitions is the least reliable operation based on the information from the GPS readings. This is because the least evidence is available regarding the corresponding times because a single GPS reading (the one that is closest for each segment) is the basis for all determined information, and this single GPS reading could be an outlier. In contrast, identifying stops involves greater confidences because stops are determined based on multiple readings, reducing an impact of an outlier GPS reading should one happen to be used in the determination.

Deviations in travel or gaps in GPS readings may invalidate or defeat determination of any segment transition between the last-visited planned stop and the next. In general, segment transitions between segments that contain matched stops involve greater confidences than those that do not contain matched stops. For example, if there are several consecutive segments that contain no matched stops, estimates of segment transition times between these consecutive segments could be incorrect, especially if the delivery vehicle 110 fails to travel the segments in sequence.

Timeline Construction

Based on the determinations described herein, the delivery system 100 may establish a timeline corresponding to the route 102. Each stop generally corresponds to two events (an arrival at a certain location and a time ti, and a departure at a later time ti+1). Each transition from one segment to the next is a single event that occurs starting at a certain location at a time t. Segment transitions may not occur while the delivery vehicle 110 is stopped, so either t≤ti or else ti+1≤t. If successive GPS stops occur during intervals [ti,ti+1] and [ti+2,ti+3] then the intervening interval [ti+1,ti+2] is assumed to be one of travel (for example, a segment transition). Each event (for example, a stop, a transition, etc.) has an associated timestamp and location. The location may have an identity if it was matched with an expected stop by the matching algorithm described above or it may have, simply, a latitude and longitude as derived in a manner as described above. Since each event includes a timestamp, the timeline can be constructed, for example, by sorting the events in a chronological order. This timeline may summarize everything known about the traversal of the route 102 one a particular day. The timeline provides an aggregation of data from which the duration of every stop as well as the travel time between stops may be determined.

In some embodiments, there may be gaps in the stream of GPS readings from one or more of the GPS devices. One type of gap is a simple failure of the GPS device to generate a reading (either the GPS device not transmitting a reading or the receiving device (for example, the vehicle location management component 200) not recording a received GPS reading. Such gaps are recognizable by a gap or break in the recorded times. The recorded times should be regular (every second, for example, for the second GPS device and every 0.1 seconds for the first GPS device). Gaps can also arise in the stream of GPS readings when flawed GPS readings are filtered out of the stream. A GPS reading is considered flawed, for example, if the NMEA sentence" does not match its checksum (field 12 of the GPRMC sentence) or if the NMEA sentence identifies the reading as invalid (field 2 of the GPRMC sentence).

The matching algorithm described herein will still work even if there are gaps in the GPS stream of readings. As soon as the stream of readings is re-established, the matching algorithm will resume associating GPS stops with expected stops. The gaps will be blind spots and may cause a reduction in confidence levels in interpretation of the delivery vehicle 110 during the gaps.

For an interval to be valid, the two GPS devices must agree that there are no intervening events, unless the first GPS device identifies a stop as requiring a dismount and the second GPS device leaves the location of the delivery vehicle 110. Events that are not trustworthy are eliminated and/or filtered from the timeline and/or other aggregated data according to the elimination algorithm described below.

First, each set of GPS readings (for example, from each GPS device) is parsed to identify significant gaps. Any travel interval that is determined to contain a significant gap is marked or flagged. Similarly, any travel interval that is adjacent to a segment transition that is "too far from" an expected location is marked or flagged (for example, if the travel interval is greater than 20 meters from the expected location). For each scan of an item being delivered, the elimination algorithm may identify and save or note a corresponding time and find the travel interval containing that scan. If the containing interval is a travel interval, that interval is marked or flagged because all scans should occur when the delivery vehicle 110 is paused. If the containing interval is a stop interval, then the elimination algorithm confirms whether the stop is sufficiently close to the expected stop (for example, a mailstop or a park point) associated with the address served by that scan. If not, the elimination algorithm marks or flags the containing interval.

The elimination algorithm then determines or identifies all marked or flagged intervals as being "untrustworthy". Any intervals that are not flagged or marked are determined or identified as being trustworthy and to be included in the model described herein. However, all stops will be saved, even if unrecognized or flagged as being untrustworthy. These stops can be used to check and correct the route 102 description, fine-tune costs (e.g., computational impacts) in the matching algorithm, and possibly identify stops that are not but should be planned.

Improving Route Descriptions

The various algorithms and procedures described herein and applied or implemented by the delivery system 100 may leave some GPS stops unmatched and, therefore, unidentified. This may occur because there existed stops that could not be anticipated, such as when the delivery vehicle 110 must wait behind another vehicle trying to make a left turn across traffic. But unidentified stops might also describe actual stops for item delivery or traffic control that are missing from the route 102 description or else incorrectly located or incorrectly sequenced. By flagging and identifying daily stops, unplanned stops that should be in the route 102 description can be better determined and identified. By such collection of regular, unplanned stops (regular in time, duration, location, etc.) the route 102 can be updated to account for the common or regular stops. In some embodiments, the unplanned stops are collected over some time period, for example, one week, two weeks, one month, two months, and so forth, identifying where clusters of the unplanned stops occur. Assuming that a cluster represents a history of stops at one location, a general location for the cluster of unplanned stopped can be determined (for example, by averaging the latitudes, longitudes, and headings of each of the stops in the cluster of unplanned stops). Furthermore, the density of each cluster may be deterministic of a frequency with which the delivery vehicle 110 stops at the corresponding location. For example, a clustering algorithm (for example, DBSCAN) can be programmed to this and identifies clusters based on density. The clustering algorithm partitions the points (corresponding to the unplanned stops) into disjoint clusters plus outliers. In some embodiments, each unvisited point p is considered, along with all points with a distance ε. If there are more than a minimum number of points within the distance ε, all those points are assigned to the same cluster as the point p, unless they are already assigned elsewhere. In some embodiments, ε is equal to 3 meters, for example when searching for mail stops at curbside mailboxes. In some embodiments, 3 meters represents the accuracy of the GPS device(s) under ideal conditions and may be necessary to separate readings from nearby mail stops. The minimum number of points may be determined based on how many days' worth of data are being analyzed. For example, if there are 50 days' worth of data, then for any specific park point, the two GPS devices of the delivery vehicle 110 are expected to generate about 100 GPS stops (50 per device) if the delivery vehicle 110 stopped at that specific park point every day. To allow for GPS reading inaccuracy or times when the carrier parked nearby or skipped the stop altogether, the minimum number of points should be set to, for example, 0.25 times 100. The resulting clusters will likely represent frequent stops at a single location, as in FIG. 7. Setting the minimum number of points to a smaller value will enable the clustering algorithm to identify smaller clusters that may represent stops that are visited less frequently.

A representative point can be constructed for each cluster by averaging the latitudes and longitudes of all points in the cluster and the representative point may be taken as the "true" stop. However, suppose that the route 102 description omitted two nearby mail stops. Each mail stop would generate a cluster of unplanned stops, which, if they overlap sufficiently, may be interpreted by the clustering algorithm as a single "cloud", which would result in a single representative point midway between the two actual mail stops. In such cases, it may be impossible to tell from a single map alone the reason for the stop (for example, that the single stop instead involves two stops). In some embodiments, such ambiguity is programmatically reduced by making use of additional information, for example, by separating out unplanned stops by segment and analyzing them segment-by-segment. This would separate the clusters surrounding two nearby stops that are directly across the street from each other. It may not be possible to programmatically separate all clusters, for example, clusters that surround two nearby mail stops on the same segment or within a cul-de-sac. Nevertheless, any cluster indicates at least one stop that should be examined. In some embodiments, the clustering algorithm may be modified or adapted to determine that two points can be considered to be in the same cluster only if the two points satisfy the usual requirements (described above) but also have similar headings (for example, have headings do not differ by more than 90 degrees).

Figure 7:
FIG. 7 is a map showing clusters of points indicating stops along the route.

FIG. 7 is a map showing clusters of points indicating stops along the route which, in some embodiments, are determined using the processes described elsewhere herein. Each point on the map represents an stop along, for example, the route 102. Each shaded point (for example, identified by points 702) represents a cluster of points representing unexpected stops with a density that exceeds a threshold (for example, 80 members within a 5 meter radius) over a number of days (for example, 50 or less) and shows where the delivery vehicle 110 stopped nearly every day. That such frequent stops were unplanned suggests errors or omissions in the route 102 and/or its description. The other black spots along the route represent stops that are expected.

Figure 8:
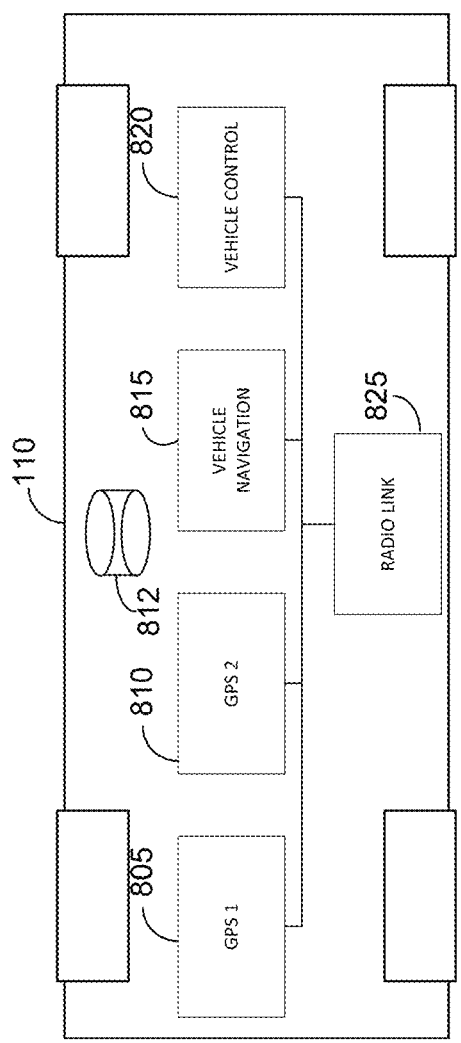
FIG. 8 is a block diagram of an exemplary delivery vehicle.

FIG. 8 is a block diagram of an exemplary delivery vehicle. The delivery vehicle 110 shown in FIG. 8 may be an exemplary embodiment of the delivery vehicles 110a-b shown in FIG. 1. The exemplary delivery vehicle 110 includes a first global positioning system (GPS) receiver 805, a second GPS receiver 810, a vehicle navigation component 815, a vehicle control component 820, and a radio link 825. The radio link 825 may enable one or more of the first GPS receiver 805, second GPS receiver 810, vehicle navigation component 815, or vehicle control component 820 to communicate wirelessly with other components of the disclosed methods and systems, such as any of the components shown in FIG. 2.

The first GPS receiver 805 and second GPS receiver 810 may receive GPS signals from GPS satellites to determine a position of the delivery vehicle 110. This information may be reported, via the radio link provided via radio link component 825, to for example, the vehicle location management component 220 in some aspects. This may enable the disclosed methods and systems to maintain a current record of a location, heading, speed, etc., of the delivery vehicle 110, and of multiple delivery vehicles 110 managed by the delivery system, such that the delivery system is able to monitor and/or adjust routes 102 as necessary to improve efficiencies.

The vehicle navigation component 815 may control navigation of the delivery vehicle 110 along a route. Route information may be retrieved from the route database 812. In some aspects, the vehicle navigation component 815 may receive route updates via the radio link 825, from, for example, the vehicle route control component 230, illustrated with respect to FIG. 2. The vehicle navigation component 815 may provide instructions to the vehicle control component 820. For example, the vehicle navigation component 815 may send commands such as a command to turn the delivery vehicle 110 to a particular heading, stop the delivery vehicle 110, or drive the delivery vehicle 110 at a particular speed to the vehicle control component 820.

The vehicle control component 820 may provide autonomous, electronic control of the delivery vehicle 110 in some aspects. As discussed above, the vehicle control component 820 may receive commands such as a command to turn to a particular heading, stop, or drive at a particular speed from a vehicle navigation component. The vehicle control component 820 may maintain electronic interfaces with vehicle systems, such as braking systems, engine systems, and steering systems (not shown in FIG. 8) that can affect the commands received from the vehicle navigation component. In aspects of the delivery vehicle 110 that may be manually controlled by a human operator, the vehicle control component 820 may function to display instructions to the human operator to effect particular routes. For example, upon receiving a command to move the vehicle to a particular address, the vehicle control component may display the address on a display screen of the vehicle, such that the human operator can read the display screen and drive the vehicle to the address. In some aspects, the human operator may be assisted by a navigation application that provides route information to the commanded address.

Route Optimization

Figure 9:
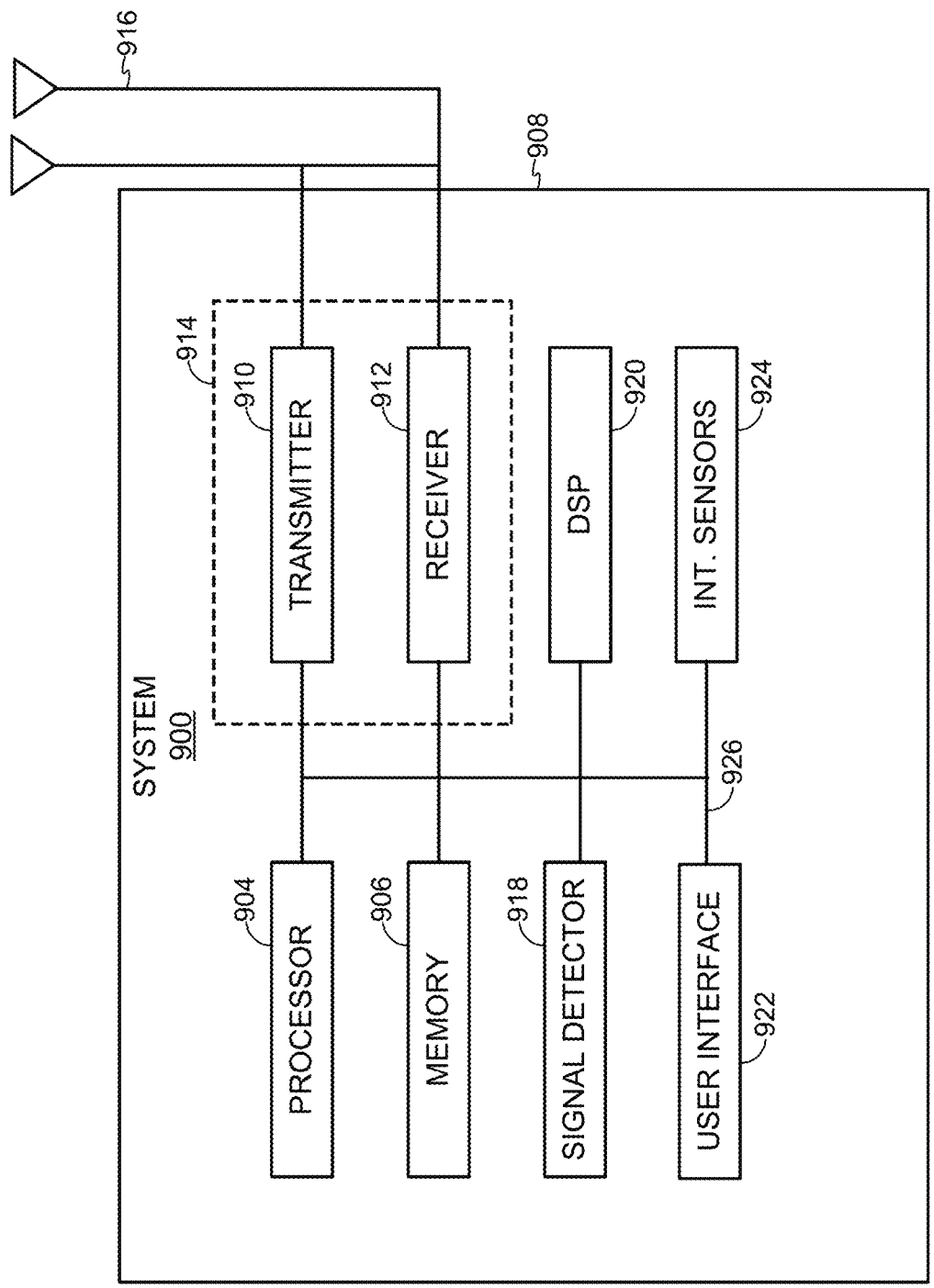
FIG. 9 is a block diagram of an exemplary computing system as implemented in a system or computer described herein.

FIG. 9 illustrates a block diagram of an embodiment of a system which may be used in the IDS described above to receive and process information regarding item delivery routes. The system 900 is an example of a system or device that may be configured to implement the various methods, steps, and functions described herein. For example, the system 900 may perform one or more of the steps or functions described herein regarding route optimization, manage and analyze inputs, determine carrier activities and routes, and other route information. In some embodiments, as described herein, the system 900 may implement and/or correspond to one or more of the components of the delivery system 100 or perform one or more of the methods described herein, for example methods 1300 and 1400 described below with reference to FIGS. 13 and 14, respectively.

The system 900 includes a processor 904 and a memory 906. The processor 904 controls operation of the system 900. The processor 904 may also be referred to as a central processing unit (CPU). The memory 906, which may include both read-only memory (ROM) and random access memory (RAM), provides instructions and data to the processor 904. A portion of the memory 906 may also include non-volatile random access memory (NVRAM). The processor 904 typically performs logical and arithmetic operations based on program instructions stored within the memory 906. The instructions in the memory 906 may be executable to implement the methods described herein.

The processor 904 may comprise or be a component of a processing system implemented with one or more processors. The one or more processors may be implemented with any combination of general-purpose microprocessors, microcontrollers, digital signal processors (DSPs), field programmable gate array (FPGAs), programmable logic devices (PLDs), controllers, state machines, gated logic, discrete hardware components, dedicated hardware finite state machines, or any other suitable entities that can perform calculations or other manipulations of information.

The processing system may also include machine-readable media for storing software. Software shall be construed broadly to mean any type of instructions, whether referred to as software, firmware, middleware, microcode, hardware description language, or otherwise. Instructions may include code (e.g., in source code format, binary code format, executable code format, or any other suitable format of code). The instructions, when executed by the one or more processors, cause the processing system to perform the various functions described herein. Accordingly, the processing system may include, e.g., hardware, firmware, and software, or any combination therein.

The system 900 may also include a housing 908. The system 900 further comprises a transmitter 910 and a receiver 912 to allow transmission and reception of data between the system 900 and a remote location or device. The transmitter 910 and receiver 912 may be combined into a transceiver 914. In some embodiments, the transmitter 910 and receiver 912 can be separate components. An antenna diversity system or array 916 may be attached to the housing 908 and electrically coupled to the transceiver 914 to enable wireless communications, although either wired and wireless communications are envisioned. The system 900 may include (not shown) multiple transmitters, multiple receivers, multiple transceivers, and/or multiple antennas diversity systems.

The transmitter 910 can be configured to wired or wirelessly transmit messages. The processor 904 may process messages and data to be transmitted via the transmitter 910. The receiver 912 can be configured to receive wired or wireless messages. The processor 904 may further process messages and data received via the receiver 912.

The system 900 also include a signal detector 918 that may be used in an effort to detect and quantify the level of signals received by the transceiver 914. The signal detector 918 may detect such signals as total energy, energy per subcarrier per symbol, power spectral density and other signals. The system 900 may also include a digital signal processor (DSP) 920 for use in processing signals. The DSP 920 may be configured to generate a packet for transmission.

The system 900 may further comprise a user interface 922 in some aspects. The user interface 922 may comprise a keypad, a microphone, a speaker, and/or a display, among others. The user interface 922 may include any element or component that conveys information to a user of the system 900 and/or receives input from the user.

The various components of the system 900 may be coupled together by a bus system 926. The bus system 926 may include a data bus, for example, as well as a power bus, a control signal bus, and a status signal bus in addition to the data bus. Those of skill in the art will appreciate that the components of the system 900 may be coupled together or accept or provide inputs to each other using some other mechanism.

Although a number of separate components are illustrated in FIG. 9, those of skill in the art will recognize that one or more of the components may be combined or commonly implemented. For example, the processor 904 may be used to implement not only the functionality described above with respect to the processor 904, but also to implement the functionality described above with respect to the signal detector 918 and/or the DSP 920. Further, each of the components illustrated in FIG. 9 may be implemented using a plurality of separate elements.

Figure 10A:
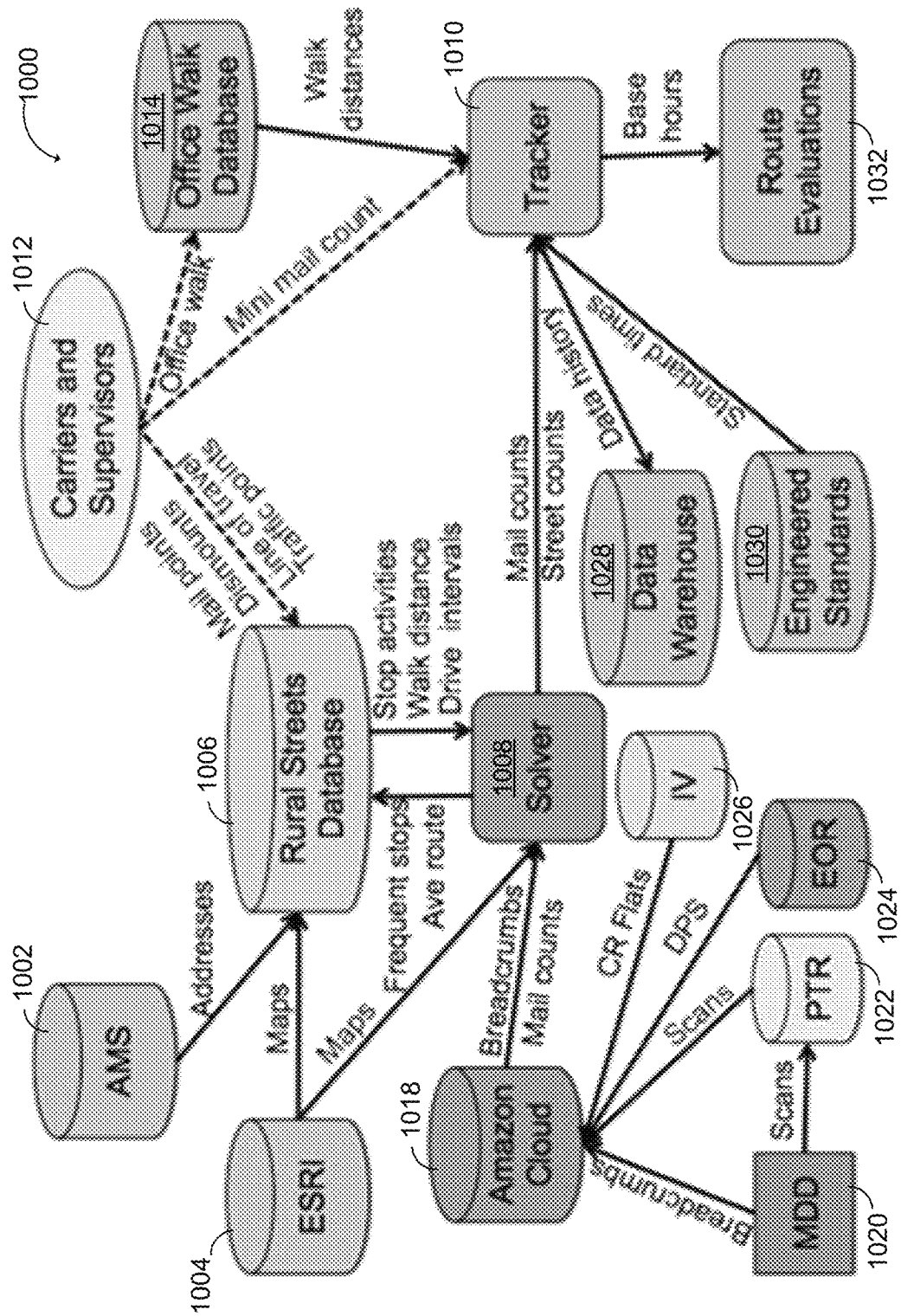
FIG. 10A shows a flow diagram schematic of a route processing system 1000 as described herein.

FIG. 10A shows a flow diagram schematic of a route processing system 1000 as described herein. In some embodiments, the route system 1000 may be implemented by the system 900. The route processing system 1000 includes various subsystems, databases, and components that interact with each other. In some embodiments, systems, components, databases, and components shown in the same color may be part of a same subsystem. Dashed lines connecting systems, databases, and components indicate manual inputs that are entered by an entity of the route processing system 1000.

The route processing system 1000, as shown, includes an address management system (AMS) 1002 that provides addresses and/or address information to a rural street database (RSD) 1006. In some embodiments, the AMS 1002 includes information about the delivery points in the IDS, including, for example addresses and geographic coordinates for the delivery points. AMS 1002 can also store route information, including the delivery points for each route, and the order or sequence of delivery points for the routes. In some embodiments, the delivery points stored in the AMS 1002 and/or delivered therefrom are sortable according to delivery order, alphabetical order, numeric order, and so forth. The route processing system 1000 further includes a map source 1004 (which can be obtained from a corporate and/or commercial supplier) for geographic maps and/or map information. In some embodiments, the map source 1004 can be a database operated and/or maintained by the delivery system. The maps and/or map information from the map source 1004 are provided to the RSD 1006 and a solver 1008.

The RSD 1006 is a processing or similar system configured to map routes digitally and collect information regarding physical characteristics of the route. In some embodiments, the RSD 1006 maps routes based on data collected from one or more sources (such as data from the MDD of one or more carriers, and so forth). The RSD 1006 identifies and communicates stop activities, walking distances, and driver intervals as outputs to a solver 1008. Additionally, the RSD 1006 receives identified stop activities and a route generated via an averaging processor or process that is performed based on sequences of GPS breadcrumbs received between mail stops or similar stops. The solver 1008 is a subsystem of the route processing system 1000 that develops digital models for carrier routes and stops to use in populating the RSD 1006 and that processes data from multiple databases to provide input to a tracker 1010. In some embodiments, the solver 1008 also receives map and/or map information from the map source 1004.

The tracker 1010 is a subsystem of the route processing system 1000 that processes data received from multiple components and/or systems and determines a standard time for each route. In some embodiments, the standard time for each route is a time required by a carrier of normal skill and ability, working at a normal day-work pace, wherein the carrier is motivated and/or experienced. In some embodiments, the standard time includes the time it takes the carrier to perform a specific task under specific conditions, to overcome fatiguing aspects of work, and to compensate for unavoidable delays. The solver 1008 communicates, to the tracker 1010, mail counts (for example, a number of pieces per day for various mail streams) and street counts (for example, a number of streets per day for various mail streams).

The RSD 1006 also receives an input from mail carriers and/or supervisors 1012 associated with the route processing system 1000. For example, the RSD 1006 receives one or more manual inputs from the mail carriers and supervisors 1012. The one or more manual inputs includes a number of mail points (for example, a number of mail points serviced along a route, etc.), a number of dismounts (for example, a number of times the carrier leaves a delivery vehicle, etc.), a line of travel (for example, roads and turns walked or driven in a delivery route that the carrier travels), and traffic control points (for example, traffic signs, etc., that control vehicular traffic flow). The mail carriers and/or supervisors 1012 also provide manual inputs to an office walk database 1014 (for example, where the manual input to the office walk database 1014 includes an office walk value comprising distances that the carrier and/or supervisor walks while performing required activities before beginning the carrier's delivery route, such as, activities within a delivery facility, walking to a vehicle, moving to the starting point of a route, etc.). In some embodiments, the office walk database 1014 conveys the walk distances (and information associated therewith), for example, distances that the carrier and/or supervisor walk as part of the mail route. In some embodiments, these inputs can be provided from the map source 1004, the RSD 1006, or from another source, and can be inputted automatically.

As shown, the solver 1008 receives information from a cloud or similar storage 1018. For example, the storage 1018 may communicate bread crumbs and/or mail counts to the solver 1008. In some embodiments, the storage 1018 may store data from various sources. For example, the storage 1018 may store breadcrumbs, for example, GPS coordinates and/or accelerometer or gyroscope data from the MDD 1020. A PTR database 1022 may comprise a database that stores outputs, such as item scans or other scans from the MDD 1020. The PTR database 1022 provides those scans to the storage 1018. An end of run (EOR) module 1024 may provide a delivery point sequence to the storage 1018. Similarly, an informed visibility (IV) module 1026 provides information regarding the current location and intended destination for items in the delivery system, including predicted arrival times for items at various facilities, and predictive item load information. The IV module 1026 can store and provide information regarding carrier routed flats having addresses that are sequenced in delivery order to the storage 1018.

Furthermore, the tracker 1010 may provide data history for storage in a data warehouse database 1028, which may be used primary to store data history related to daily standards. Engineered standards, for example, standards for performing certain actions, travel times, etc. may be stored in an engineered standards database 1030, and standard or expected times (for the certain actions, tasks, or activities) from the engineered standards database 1030 may be communicated to the tracker 1010. For example, some engineered standards may include expected times for casing mail, parcel handling, office paperwork and miscellaneous activities, street paperwork and miscellaneous activities, and so forth. The tracker 1010 may further store base hours (for example, weekly hours used as a basis for rural carrier pay) to the route evaluations module 1032.

Figure 10B:
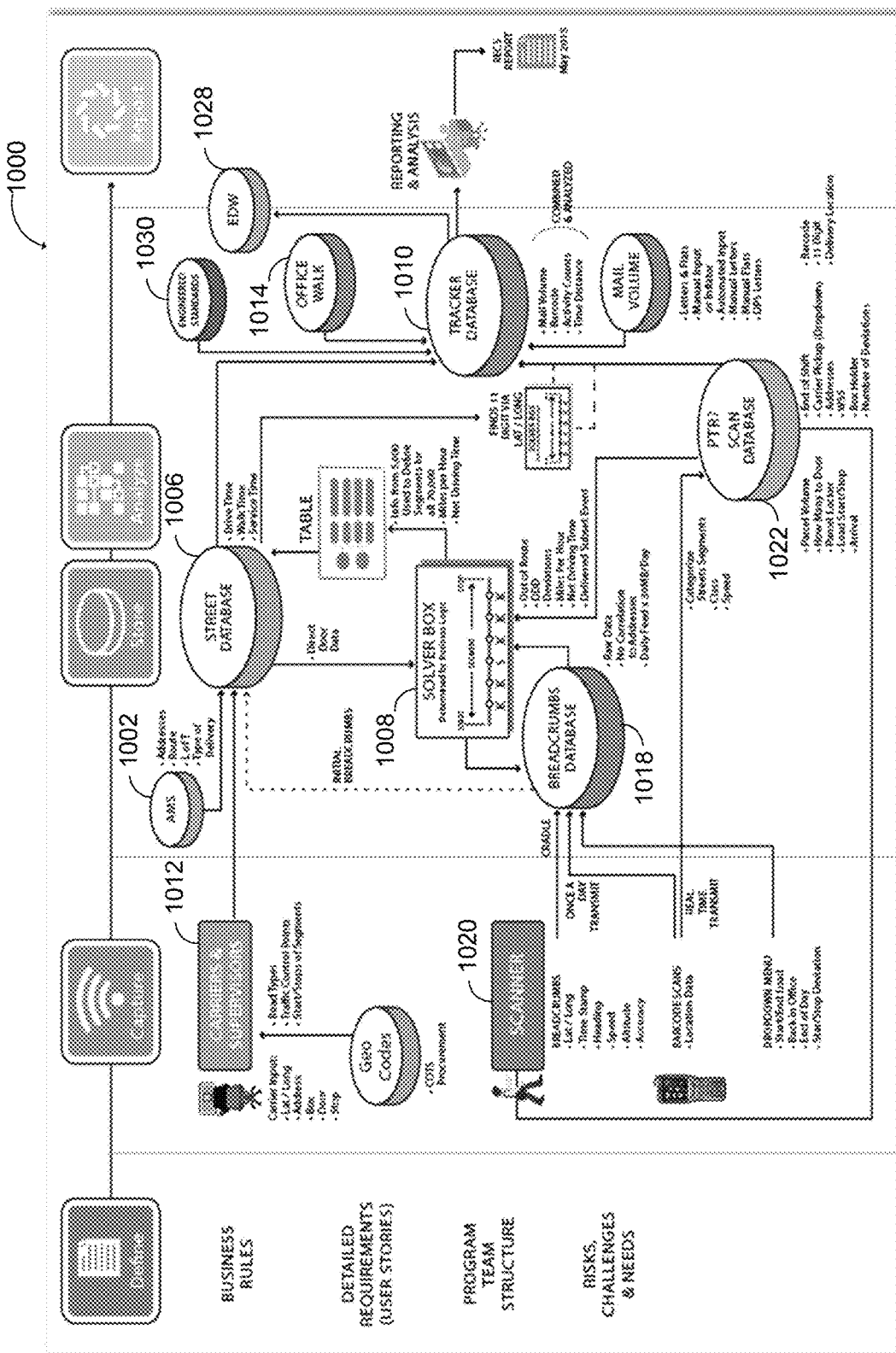
FIG. 10B shows an alternative block diagram of various components of the route processing system 1000 of FIG. 10A, as described herein.

FIG. 10B shows an exemplary embodiment of a block diagram of various components of the route processing system 1000 of FIG. 10A, as described herein. As shown, FIG. 10B shows various data flows and components of the route processing system 1000 as it relates to the diagram of FIGS. 12A-B below. FIG. 10B also provides additional detail regarding what information may be exchanged by the various components of the route processing system 1000 depicted in FIG. 10A.

The route processing system 1000 may provide for evaluation and adjustment of rural carrier work activities for all rural routes associated with the delivery system. In some embodiments, the route processing system 1000 identifies data elements necessary to count all work activities and creates a complex data-capture system to provide daily counts of each of the data elements, providing for a more dynamic and more often updated basis, to generate an accurate digital route representation. The route processing system 1000 may also utilize various standards, generated based on engineering and/or statistical data, to specify time allowed and/or allocated to complete each work activity counted. Additional logic may compute base hours and similar analytics to establish evaluations of rural routes for pay purposes.

In operation, the route processing system 1000 uses information from such other systems, databases, and components to evaluate existing routes and develop new routes. Accordingly, the route processing system 1000 provides a mostly automated data capture system capable of generating daily counts of work activities, newly engineered and statistical standards based on generally accepted industrial engineering principles, and an automated system of business logic that calculates and updates the evaluations of rural routes and assists in generated amended or new rural routes.

In some embodiments, the route processing system 1000 described herein enables automation of data capture used to develop and/or perform accurate engineered route evaluations and may eliminates a need for comprehensive mail counts. Based on the data obtained from the various system, databases, and components contained therein, the route processing system 1000 may count work activities performed by various entities (for example, carriers, supervisors, etc.) on a daily or other quantitative basis without any or with minimal entity intervention. The resulting counts may be used to calculate standard times for completing and/or performing the work activities and/or rural routes or other analysis or management functions.

In some embodiments, the route processing system 1000 counts data based on information from a mapping system that includes information of customer addresses and routes as they relate to a geographic or similar map. Additionally, the route processing system 1000 may update existing maps and corresponding information of the mapping system, which may provide details of a stop (e.g., a door, mailstop, mail box, and/or direct door delivery point details) associated with each customer address.

The engineered standards described above may be based on generally accepted industrial engineering practices and have been validated and/or fully documented in a uniform structure and format. A drive speed matrix calculates accurate drive times based on specific route characteristics, where the drive speed matrix is generated based on an aggregation numerous drive time samples. In some embodiments, logic may be used to generate route evaluations and update those evaluations as needed on, for example, a pay period basis. In some embodiments, other bases for updates may be used. Furthermore, in some embodiments, the route processing system 1000 may edit and/or identify updated line-of-travel mappings for rural routes to efficiently generate line-of-travel mappings that provide more efficient rural routes. Furthermore, the route processing system 1000 may update engineering standards according to dynamically changing factors, such as a business environment, etc.

One or more routes along the delivery system may be optimized to reduce operational costs, for example by optimizing a number of stops along the route, optimizing the route traveled by the delivery vehicle 110, or optimizing a territory covered by the route. In some embodiments, the one or more routes are optimized based on passive or active data collection (for example, GPS breadcrumbs, route address information, carrier activity information, package scans, and so forth). The information from the data collection may be fed into various algorithms to model and optimize the one or more routes. In some embodiments, the one or more routes may comprise all routes within a particular region or geographic area, for example those served by a particular distribution facility or post office. By applying the various algorithms to the collected data, routes may be optimized across the area served by the distribution facility or post office (for example, a delivery unit) or optimize one or more factors of a single or individual route. In some embodiments, route optimization is triggered or based on goals for optimizing a particular route, for example to achieve savings through individual route optimization.

Route optimization may generally involve four basic steps: 1) gathering route data; 2) generating a digital route; 3) generating an optimized route; and 4) implementing an optimized route. Each of these basic steps comprises various other steps, as will be described in further detail below.

Figure 11A:
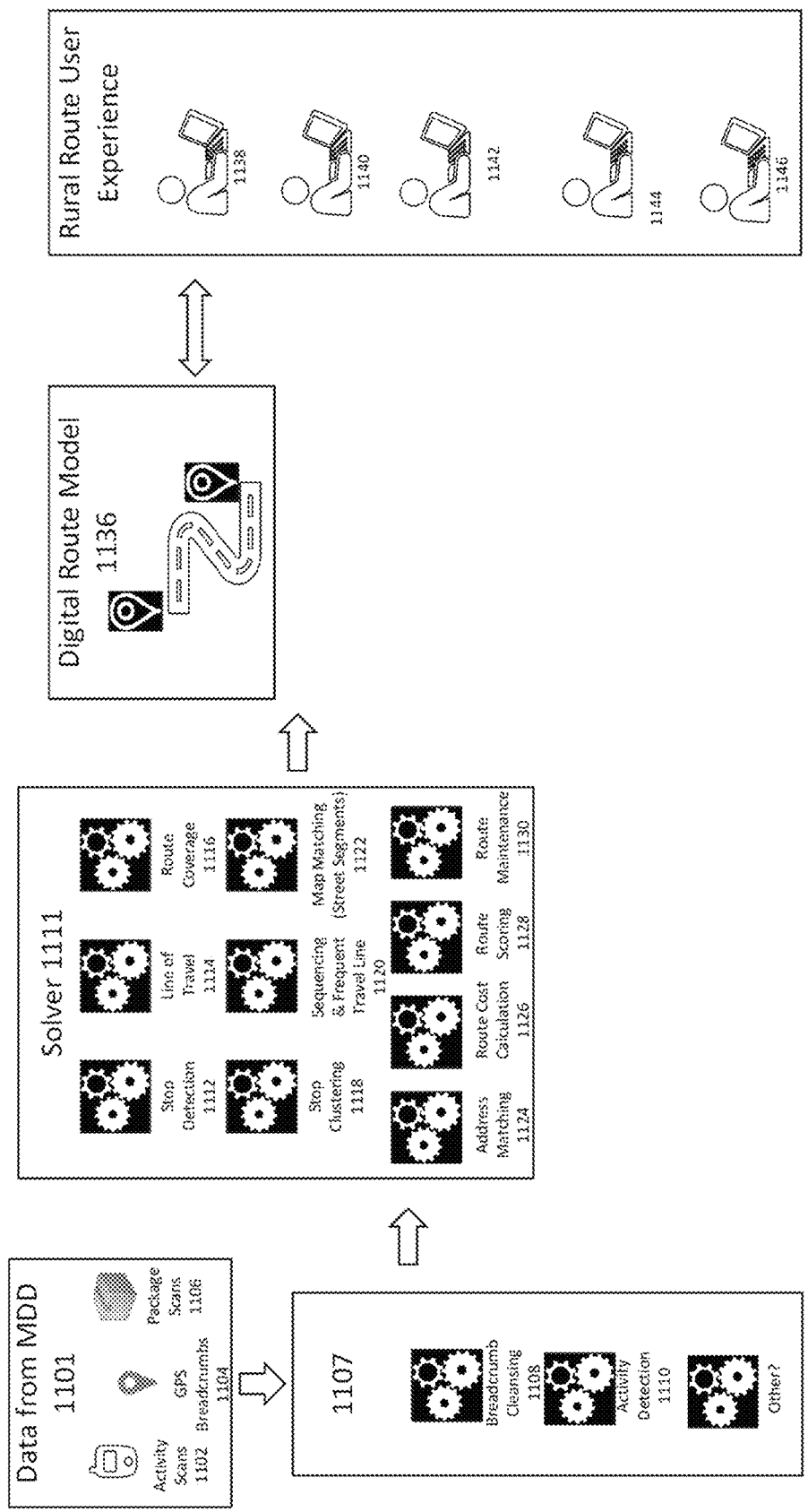
FIG. 11A shows a data flow diagram for a GPS and route processing system.

FIG. 11A shows a data flow diagram for a GPS and route processing system. In some embodiments, the processes and modules shown are implemented by one or more components of the system 900. As shown, FIG. 11A provides some exemplary details for two of the four basic steps introduced above: the gathering route data and the generating a digital route steps.

The gathering route data step may comprise the active and/or passive data collection described above. For example, with reference to FIG. 11A, GPS breadcrumbs 1104 received from the carrier's MDD 1101 may be collected and stored before, while, or after the carrier services an assigned route, thereby providing data (for example, activity data, location data, and so forth) for various activities and stops as the carrier's travels along the route. In some embodiments, the gathered route data also includes information regarding activities that the carrier performs prior to, while, or after traveling the assigned route. Additionally, package and/or parcel scans 1106 may also be obtained from the carrier's MDD 1101, along with activity scans 1102 of what the carrier is doing at various times/locations along the route. Furthermore, the gathered route data may include address data and/or route data as received from one or more address and/or road network data sources. For example, the gathered route data includes mail count results or master list data. The gathered route data may be processed; for example, the GPS breadcrumbs 1104 are processed to identify stops along the route and the travel path taken by the carrier. Furthermore, all data received from the carrier's MDD 1101 is processed to determine what activity or activities the carrier is performing at any given time.

FIG. 11A depicts components of the input data and processing that the system 900 uses to generate digital routes that carriers are servicing, including both the in-office (distribution facility) and street portions. The data flow begins with the system 900 receiving or gathering data from the carrier's MDD 1101.

In some embodiments, the data received from the carrier's MDD 1101 may begin with login information or other setup information that indicates that the carrier is activating or preparing the MDD 1101 for the day's activity. In some embodiments, such information may be received via one or more activity scans 1102. The carrier's MDD 1101 may also provide GPS breadcrumbs 1104 and package scans 1106.

In some embodiments, the activity scans 1102 may include information regarding activities that the carrier performs before embarking on the street portions of the route. In some embodiments, such activity scans 1102 may include scans regarding preparing items for the upcoming route, loading the delivery vehicle 110, and so forth. The GPS breadcrumbs 1104 may be received in one second intervals and may include GPS location information and time information. The package scans 1106 may include information from the MDD 1101 regarding packages that are scanned for pickup or delivery by the carrier while along the route. In some embodiments, the package scans 1106 are received before the carrier embarks on the route, while traversing the route, and after arriving back to the distribution facility after the route is completed.

The data received from the MDD 1101 may be processed at block 1107. The initial processing may include daily processing that includes cleansing the GPS breadcrumbs 1108 and activity detection 1110. The GPS breadcrumbs 1104 may be cleansed and/or processed to determine what activity is performed for each GPS breadcrumb 1104 or group of GPS breadcrumbs. That is, the GPS, accelerometer, and/or gyroscope breadcrumb data, or any combination thereof, is analyzed to determine what action the carrier is performing and/or where the carrier is located when the GPS breadcrumbs 1106 are received. In some embodiments, cleansing or processing the GPS breadcrumbs comprises parsing location and time information. In some embodiments, the initial processing also includes daily processing or activity detection 1110 of the activity scans 1102 information. For example, such processing comprises determining that the activity scans 1102 includes a scan or information that indicates that whether the carrier is activating the MDD 1101 or walking to or loading the delivery vehicle 110 being used for the day. In some embodiments, based on the activity detected by the activity detection 1110, the system 900 may assign one or more activities to the carrier's route. The assigned activities may be identified from a list of possible activities, some of which are identified in Table 2 below.

Carrier routes include various aspects of a carrier's daily workload. For example, while the carrier route includes traversing the corresponding path between delivery points and delivering the items, the carrier route may also include activities that the carrier performs to prepare for the route before leaving the distribution facility to travel to each delivery point and activities performed after the carrier returns to the distribution facility after visiting all assigned delivery points. Some of these activities may include setting up the carrier's MDD, walking within the distribution facility, gathering the items they will be delivering, and so forth. A more detailed listing of some of these actions is provided in Table 2 below.

TABLE 2

| Sequence Description | Standards Applied | Location/Time | Classification |
|---|---|---|---|
| Scanner setup activities | S001: Scanner Setup | Office am | Fixed |
| Office Walking | S002: Office walking speed | Office am | Volume |
| Gather random mail for transport to case | S003: Gather random mail | Office am | Fixed |
| Case random letters | S004: Case random letters | Office am | Volume |
| Case random flats | S005: Case random flats | Office am | Volume |
| Case carrier route flats | S006: Case Carrier Route flats | Office am | Volume |
| Gather DPS letters for transport to case | S007: Gather DPS letters, S200: DPS letters per tray | Office am | Volume |
| Locate and access DPS letter trays | S008: Locate and access DPS letter trays | Office am | Fixed |
| Case DPS letters | S009: Case DPS letters | Office am | Volume |
| Case WSS flats | S010: Case WSS flats | Office am | Volume |
| Case WSS letters | S011: Case WSS letters | Office am | Volume |
| Case Boxholder flats | S012: Case Boxholder flats | Office am | Volume |
| Case Boxholder letters | S013: Case Boxholder letters | Office am | Volume |
| Gather DPS flats for transport to case | S014: Gather DPS flats, S201: DPS flats per tray | Office am | Volume |
| Locate and access DPS flat trays | S015: Locate and access DPS flat trays | Office am | Fixed |
| Case DPS flats | S016: Case DPS flats | Office am | Volume |
| Pull down handle trays | S017A: Pull down-handle tray, S219: Fraction of small parcels in sm-med total, S220: Pull down mail pieces per tray | Office am | Volume |
| Pull down handful | S017B1: Pull down-handful, S221: pull down mail pieces per handful/rubber band | Office am | Volume |
| Pull down compartments | S017B2: Empty 1 or 2 compartments. | Office am | Offc/Rte |
| Position and remove rubber bands | S017C: Position and remove rubber band, S221: pull down mail pieces per handful/rubber band | Office am | Volume |
| Gather parcels for transport to case | S018: Gather parcels, S208: Parcels per hamper | Office am | Volume |
| Organize large parcels for delivery | S019: Organize large parcels, S209: Lg parcels in accountables | Office am | Volume |
| Organize small/medium parcels for delivery | S020: Org sm and med parcels, S210: Sm & med parcels in accountables | Office am | Volume |
| Process accountable mail, signature items | S021: Process accountable mail, signature items | Office am | Volume |
| Process customs due | S022: Process customs due | Office am | Volume |
| Process COD | S023: Process COD | Office am | Volume |
| Process postage due | S024: Process postage due | Office am | Volume |
| Perform fixed accountable cage activities | S025: Perform fixed accountable cage activities | Office am | Fixed |
| Process carrier pick-up event forms | S026: Process carrier pick-up event forms | Office am | Volume |
| Process markups-bundles | S027: Process markup bundles, S211: Markup bundles per addressed mail pc | Office am | Volume |
| Process change-of-address forms | | | |
| Process PARS label (Form 3982) | S029: Process PARS label (Form 3982) | Office am | Volume |
| Complete trip report (Form 4240) | S030: Complete trip report (Form 4240) | Office am | Fixed |
| Move trays to storage | S031: Move trays to storage | Office am | Fixed |
| Load vehicle | — | Office am | Actual time |
| Inspect Government vehicle | S032: Inspect Government vehicle | Office am | Fixed |
| Drive (basic route) | — | Street-rte | Offc/Rte |
| Walk (basic route) | — | Street-rte | Offc/Rte |
| Service (basic route) | — | Street-rte | Offc/Rte |
| Drive (mail stop to DDD stop) | S033: Driving speed (mail stop to DDD stop) | Street-door | Volume |
| Walk (DDD stop to door) | S034: Walking speed (DDD stop to door) | Street-door | Volume |
| Deliver parcels to door | S035: Deliver parcels to door | Street-door | Volume |
| Deliver parcels to mailbox | S036: Deliver parcels to mailbox | Street-rte | Volume |
| Deliver parcels to parcel locker | S037: Deliver parcels to parcel locker | Street-rte | Volume |
| Deliver accountable mail, signature item | S038: Deliver accountable mail, signature items | Street-door | Volume |

TABLE 2-continued

| Sequence Description | Standards Applied | Location/Time | Classification |
|---|---|---|---|
| Deliver customs due | S039: Deliver customs due | Street-door | Volume |
| Deliver COD | S040: Deliver COD | Street-door | Volume |
| Collect postage due | S041: Collect postage due | Street-door | Volume |
| Collect registered/certified mail | S042: Collect registered/certified mail, S212: fraction reg-cert per address | Street-door | Offc/Rte |
| Collect money order applications | S043: Collect money order applications, S213: fraction money order per address | Street-door | Offc/Rte |
| Accept ord, cod, ins parcels | S044: Accept ord, cod, ins parcels, S214: fraction ord, cod, ins per address | Street-door | Offc/Rte |
| Carrier pickup & prepaid event | S045: Carrier pickup & prepaid event | Street-door | Volume |
| Carrier pickup & prepaid items | S046: Carrier pickup & prepaid items | Street-door | Volume |
| Perform prelim & concluding activities at vehicle for trip to door | S047: Prelim & concluding at vehicle for trip to door | Street-door | Volume |
| Gather accountable mail/large parcel at vehicle | S048: Gather accountable mail/large parcel at vehicle | Street-door | Volume |
| Deviation for express delivery (walk or drive) | — | Street-door | Actual time |
| Service (blue box) collection points | S049: Service (blue box) collection points | Street-rte | Offc/Rte |
| Service inter-unit mail (low volume) | S050: Service inter-unit mail (low volume) | Street-rte | Offc/Rte |
| Service inter-unit mail (high volume) | S051: Service inter-unit mail (high volume) | Street-rte | Offc/Rte |
| Fuel vehicle | S052: Fuel vehicle, S215: constant for refueling miles per refuel | Street-rte | Offc/Rte |
| Reload mail for delivery | S053: Retrieve first mail tray behind bulkhead, S054: Retrieve additional mail trays behind bulkhead, S055: Retrieve first mail tray under platform, S056: Retrieve additional mail trays under platform, S057: Retrieve first mail tray rear door, S058: Retrieve additional mail trays rear door, S202: Random letters per tray, S203: Random flats per tray, S204: Small parcels per tray, S205: Boxholders per tray, S200: DPSL per tray, S201: DPSF per tray, S218: Fraction of med parcels in sm-med total, S219: Fraction of small parcels in sm-med total | Street-rte | Volume |
| Reload medium parcels for delivery | S059: Retrieve first med parcels tub behind bulkhead, S060: Retrieve addl med parcels tubs behind bulkhead, S061: Retrieve first med parcels tub rear door, S062: Retrieve addl med parcels tubs rear door, S206: Med parcels per tray, S218: fraction medium parcels in sm-med total | Street-rte | Volume |
| Reload large parcels for delivery | S063: Move large parcels from cargo area to rear door, S064: Move addl large parcels cargo area to rear door, S209: Fraction lg parcels in accountables. | Street-rte | Volume |
| Perform simple one-step scans | S065: Perform simple one-step scans | Office am Street door | Volume |
| Perform prompted two-step scans | S066: Perform prompted two-step scans | Office am Street door | Volume |
| End-of-shift office activities | — | Office pm | Actual time |
| Contact Rural Reach customers | S067: Contact Rural Reach customers | Street-rte | Volume |

TABLE 2-continued

| Sequence Description | Standards Applied | Location/Time | Classification |
|---|---|---|---|
| Sell stamp stock | S068: Sell stamp stock | Street-rte | Volume |
| Total Actual Time-Office | — | NA | NA |
| Total Actual Time-Street | — | NA | NA |
| Total Standard Time-Office | — | NA | NA |
| Total Standard Time-Street | — | NA | NA |
| Total Lunch Time-Office | — | NA | NA |
| Total Lunch Time-Street | — | NA | NA |
| TCP Duration | — | Street-rte | Offc/Rte |
| Carrier pickup item and manifest scans | S070: Full scan. S071: partial scan | Street-rte | Volume |
| Miscellaneous activities | | Offc and street | Actual time |
| Safety service talks | S002: Office walking speed | Office am | Actual time |
| Office Walking-DPSL | S002: Office walking speed | Office am | Volume |
| Verify addresses | S144: Verify letter address, S145: Verify flat address, S219: Fraction of small parcels in sm-med total | Street-rte | Volume |
| Miscellaneous to door deliveries | S069: Deliver miscellaneous to door | Street-rte | Volume |

For example, if the activity detection 1110 determines that the carrier activated the MDD 1101 and walked to the delivery vehicle 110, and loading the delivery vehicle 110, these three activities (activating the MDD 1101, walking to the delivery vehicle 110, and inspected the delivery vehicle 110, corresponding to standards S001, S002, and S032) are added to the carrier's route for the day by the system 900. Each action of a carrier's route can be assigned to an activity from Table 2. As such, the activity detection 1110 allows the delivery system 100 to identify or assign, for each portion of the a digital model of a route, or to an optimized route, which standard applies to the portion, when that portion occurs, and whether that portion involves a variable or fixed time. Thus, the activity detection 1110 and/or the delivery system 100 assigns standards to each portion of the optimized route. Nominal routes may also have standards assigned to each portion of the nominal routes. Where each portion is associated with a standard, the standards for the respective route may be further used to determine a total amount of time and activities associated for the digital model, optimized, or nominal route. Thus, the delivery system 100 may use the standards to identify times associated the optimized or nominal route. In some embodiments, when the route data is collected from carrier devices or mobile computing devices, the individual route segments, data points, GPS location breadcrumbs, or other divisions, sections, or parts of the route data can be assigned a task standard or an activity standard from the table above. In addition, a nominal route can have each section of the route, each segment of time, etc., can each be assigned a standard. Thus, route data can include a plurality of standards according to the activity or event performed along a route, during a delivery day, etc.

Figure 11B:
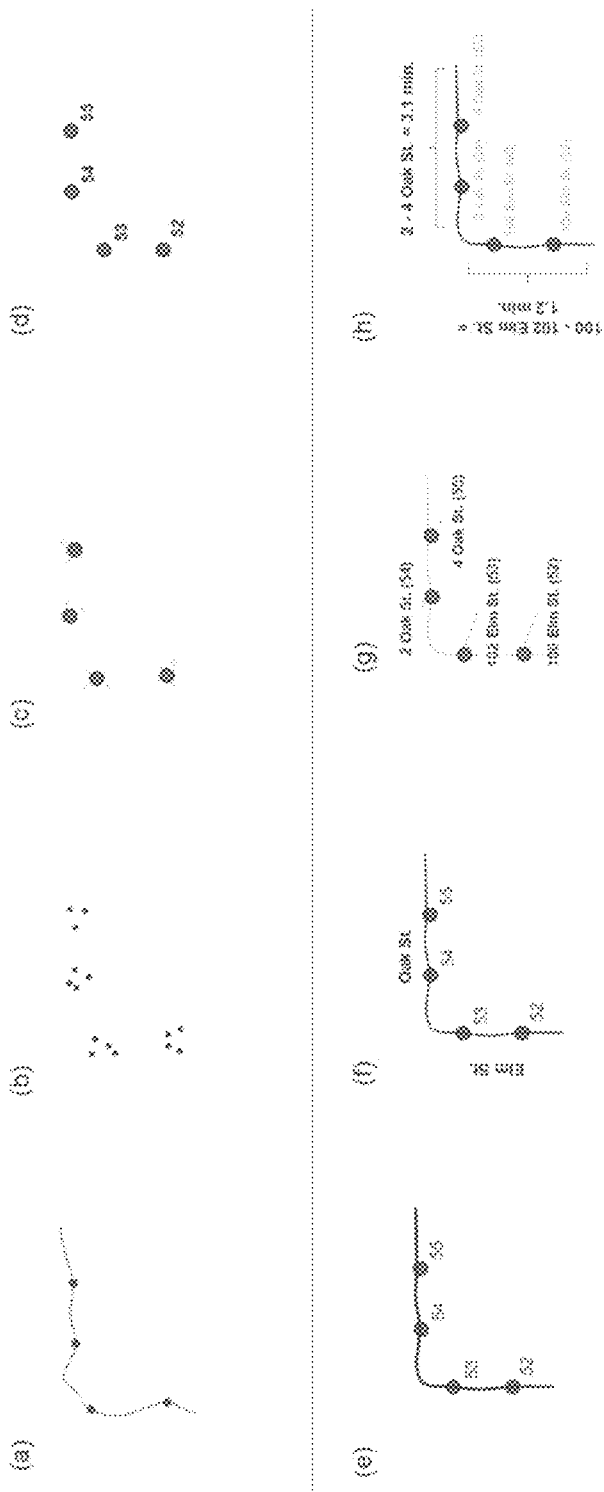
FIG. 11B is a series of diagrams illustrating steps in digitizing a route traveled by a carrier.

The solver 1111 may perform one or more actions or steps that are used to generate the digital route corresponding to the carrier's actual route. FIG. 11B shows a series of diagrams (a)-(g) illustrating at least one of these steps. Based on the processed gathered data, a digital route may be generated, for example via a solver component. While digitizing the route, various metrics may be determined and/or captured. In some embodiments, generating the digital route comprises using one or more of the gathered route data. Generating the digital route may comprise the following steps based on the gathered route data, similar to the details provided above.

A first step in generating the digital route may involve analyzing the processed GPS breadcrumbs to determine one or more stops along the route traveled by the carrier (i.e., stop detection). Such stop detection based on the GPS breadcrumbs 1104 may be performed by the solver 1111 at stop detection 1112. In some embodiments, the stop detection 1112 represents an algorithm according to which the solver 1111 (and the system 900) detects a stop based on the received GPS breadcrumbs 1104. In some embodiments, the stop detection 1112 algorithm may conform to one or more of the processes or steps described above. For example, the stop detection 1112 may comprise one or more steps or processes as described in the section above regarding estimating vehicle stops.

As shown in (a) in FIG. 11B, system 900 may receive GPS breadcrumbs from the carrier servicing the route as the carrier travels to each delivery point or stop. The system 900 receives GPS breadcrumbs at the delivery points or stops as well as along the path the carrier takes to travel to and between the delivery points. The "randomness" of the path of the GPS breadcrumbs between the larger dots (representing the delivery points) shows how the path to and between the GPS breadcrumbs may not be the most efficient. The GPS breadcrumbs may be used to identify stops along the route. For example, if the system 900 receives multiple GPS breadcrumbs with the same location information but different time stamps, the system 900 may determine that the carrier was at a delivery point or stop if the multiple GPS breadcrumbs satisfy corresponding threshold requirements. The stop detection may involve capturing metrics such as a location of a stop (for example, GPS location), a duration of the stop, (how long the carrier was stopped at the stop) and mileage of the route up to that particular stop.

A second step may comprise layering all of the stops identified via the first step. Such layering may be performed by the solver 1111. In some embodiments, the layering represents an algorithm according to which the solver 1111 (and the system 900) layers the stops from a plurality of detected stops determined based on the received GPS breadcrumbs 1104. In some embodiments, the layering algorithm may conform to one or more processes or steps.

As shown in (b) of FIG. 11B, layering may involve identifying GPS breadcrumbs from multiple travels of the route that generally appear to represent the delivery point.

For example, the determined or detected stops from a plurality of traversals of the route may be layered to assist in determining the locations for the delivery points. Accordingly, metrics captured from the layers of daily stops include GPS availability and territory distribution. The system 900 may determine multiple stops based on the GPS breadcrumbs 1104 as described above as the carrier travels the route on a plurality of days. The layering of these stops may allow the system 900 to perform further processing of the delivery points, as described in further detail below. For example, the layering of the stops may include averaging the detected stops from the stop detection 1112. In some embodiments, the layering of the stops may include identifying the mean or median of the detected stops.

At a third step, frequent stops are identified based on the multiple stops identified from the layering of the second step. Such clustering of the various stops may be performed by the solver 1111 at stop clustering 1118. In some embodiments, the stop clustering 1118 represents an algorithm according to which the solver 1111 (and the system 900) determines or identifies a frequent stop based on the multiple previously identified stops. In some embodiments, the stop clustering 1118 algorithm may conform to one or more of the processes or steps described above. For example, the stop clustering 1118 may comprise one or more clustering algorithms (for example, DBSCAN) or another clustering algorithm that identifies clusters based on density.

As shown in (c) of FIG. 11B, the clusters of layered daily stops may be averaged and replaced with frequent stops. The frequent stops may be identified by merely looking at a number of daily stops that are layered around a general location, which is determined as being a cluster point. In some embodiments, the frequency stop is determined by having a number of stops daily stops that exceeds a first threshold value. In some embodiments, the duration of the daily stops is determinative in the analysis of the frequent stop. As shown, there are four frequent stops that are identified based on the layers of stops from step two. Metrics captured from step three include the cluster frequency (for example, the number that determines what defines the frequent stop) and the cluster duration (for example, an average spent at the frequent stop determined from each of the stop durations of the daily stops used to define the frequent stop.

A fourth step involves placing the frequent stops in a sequence that represents an order or path that the carrier servicing the route likely followed. Such sequencing of the frequent stops may be performed by the solver 1111 at sequencing and frequent travel line 1120. In some embodiments, the sequencing and frequent travel line 1120 represents an algorithm according to which the solver 1111 (and the system 900) determines or identifies a sequence of the frequent stops. In some embodiments, the sequencing and frequent travel line 1120 algorithm may conform to one or more of the processes or steps described above for generating a sequence of stops.

As shown in (d) of FIG. 11B, each frequent stop is assigned a number in the sequence of frequent stops in the route. For example, the frequent stop sequencing is determined based on simply following a path to the next stop that is closest to the previous stop. In some embodiments, the frequent stop sequencing is determined based on traffic patterns between frequent stops, available routes between frequent stops, and so forth. As shown in (d), the frequent stops are stops 52, 53, 54, and 55 for this route. The metric determined at step four includes sequence variability, meaning how much can the sequence vary.

Based on determining the sequence of stops in the fourth step, a travel path for the carrier is determine in the fifth step. Such determining of the travel path may be performed by the solver 1111 at line of travel 1114. In some embodiments, the line of travel 1114 represents an algorithm according to which the solver 1111 (and the system 900) determines or identifies line of travel or path of travel for which the sequence of stop is serviced or traveled. In some embodiments, the line of travel 1114 algorithm may conform to one or more of the processes or steps described above. In some embodiments, the line of travel 1114 algorithm may determine an order in which the sequence of stops is serviced or visited.

As shown in (e) of FIG. 11B, identifying the travel path may involve calculating the most efficient path between successive frequent (i.e., the sequenced) stops in the route that follow existing travel paths (roads, etc.). In some embodiments, the travel path identification generally defines the roadway, type of road, or traversable path between the next stop and the previous or current stop. Accordingly, all stops that occurred along the route comprise one or more identifying carrier passable routes that efficiently take the carrier to each frequent stop in the sequence determined in step four. For example, identifying the travel path comprises determining that a single road is the shortest route between two stops or determining that the only way to get from a first stop to a second stop is to backtrack within a neighborhood. Also as part of the fifth step, the order in which the frequent stops are visited is also determined. As shown, the frequent stops are visited sequentially (in the order 52, 53, 54, and 55) for this route. The metrics captured at the fifth step include a frequency that a path is traveled and a route mileage associated with the route from a first stop to a last stop.

In the sixth step, road names and other road network identifiers are added or assigned to the travel paths identified in the fifth step. Such identifying of road names, etc., may be performed by the solver 1111 at map matching 1122. In some embodiments, the map matching 1122 represents an algorithm according to which the solver 1111 (and the system 900) determines or identifies road names that conform or identify the travel path segments identified in the fifth step. In some embodiments, the map matching 1122 algorithm may conform to one or more of the processes or steps described above. For example, the map matching 1122 may comprise one or more algorithms that parse map data to identify particular sections that match the travel path.

As shown in (f) of FIG. 11B, identifying the paths means adding Elm St. for stops 52 and 53 and Oak St. for stops 54 and 55. For example, at the sixth step, a street that two frequent stops are positioned on is identified. As shown, two of the identified frequent stops are on Elm St. (52 and 53) while the next two are on Oak St. (54 and 55). Additionally, or alternatively, a number of turns that the carrier must make in order to complete the route is determined. In some embodiments, the metrics identified and saved include the turn count and off-grid counts. The metrics captured by the sixth step may be used as inputs to the RDS.

At the seventh step, addresses are associated with the frequent stops. Such identifying of addresses, etc., may be performed by the solver 1111 at address matching 1124. In some embodiments, the address matching 1124 represents an algorithm according to which the solver 1111 (and the system 900) determines or identifies the addresses corresponding to the frequent stops identified in the fifth step. In some embodiments, the address matching 1124 algorithm may conform to one or more of the processes or steps described above. For example, the address matching 1124 may comprise one or more algorithms that parse map data to identify particular sections that match the addresses of the frequent stops (for example, via an overlay of map data and the frequent stops or similar.

As shown in (g) of FIG. 11B, stop 52 has an address of 100 Elm St., stop 53 has an address of 102 Elm St., stop 54 has an address of 2 Oak St., and stop 55 has an address of 4 Oak St. The metrics identified and saved are the association confidence (for example, the confidence in the association of the address with the frequent stop) and the scan density (for example, the number of scans or density of scans for each of the addresses).

At the eighth step, a cost calculation is performed or generated for the route. The cost calculation may determine an amount of time it takes to visit one or more frequent stops along the route. Such identifying of costs, etc., may be performed by the solver 1111 at route cost calculation 1126. In some embodiments, the route cost calculation 1126 represents an algorithm according to which the solver 1111 (and the system 900) determines or identifies costs associated with one or more aspects of the route, as identified in the first through seventh steps. In some embodiments, the route cost calculation 1126 algorithm may conform to one or more of the processes or steps described above. For example, the route cost calculation 1126 may comprise one or more algorithms or equations that are used to determine an amount of time one or more segments of the route are expected to take. In some embodiments, the route cost calculation 1126 may include one or more steps described above, for example one of the equations described above.

For example, as shown in (h) of FIG. 11B, the segment of the route including stops 52 and 53 is shown to take 1.2 minutes to serve while the segment of the route including stops 54 and 55 is estimated to take 3.1 minutes to serve. The metrics identified and saved in the eighth step are route duration (how long it takes to serve/visit all the stops along the route or at least a portion of the stops along the route) and a route evaluation, which may comprise whether or not the route is ready or expected to be analyzed for optimization.

In a ninth step, a confidence level in the generated digital route is identified or developed. In some embodiments, the confidence level is determined at least in part on each of the steps 1-8 described above. In some embodiments, the confidence level is an aggregate of confidence levels for each of the steps 1-8 described above. The confidence level determination may determine the overall confidence level of the route may be determinative of whether the route is ready for optimization. Such determination of confidence may be performed by the solver 1111 at route scoring 1128. In some embodiments, the route scoring 1128 represents an algorithm according to which the solver 1111 (and the system 900) determines or identifies confidence levels associated with one or more aspects of the route, as identified in the steps 1-8. For example, if the confidence level for the route is approximately 10-15% or less, this may be indicative of a major issue in the carrier's work or interactions with components or equipment used in the delivery of items along the route (for example, issues with carrier logging into the MDD, and so forth). If the confidence level for the route is between approximately 10-15% and approximately 50-60%, this may be indicative of a less problematic issue with the carrier (for example, servicing the route out of sequence, or so forth). If the confidence level for the route is greater than approximately 95%, this may indicate that the route is ready for optimization.

In the tenth step, the route may be maintained, meaning steps 1-9 are continuously repeated when there is a change to a delivery point in the route or when compensation is made based on mileage or another change to the route that is outside of an expected tolerance range. Alternatively, or additionally, the route maintenance comprises tracking and/or otherwise monitoring aspects of the route such that the digital route is an accurate representation of the route traveled by the carrier. Such route maintenance may be performed by the solver 1111 at route maintenance 1130. In some embodiments, the route maintenance 1130 represents an algorithm according to which the solver 1111 (and the system 900) updates and/or monitors the digital route to match or conform to the actual route traveled by the carrier. In some embodiments, the route maintenance 1130 may comprise performing one or more of the steps identified above in steps 1-9.

After the solver 1111 has processed the data and information as described above, the solver 1111 may generate a digital route model 1136 that generally represents the average, or current, or assigned physical route traveled or serviced by the carrier. The digital route model 1136 may represent the physical route for the entire end-to-end line of travel, which may include when the delivery vehicle 110 leaves a distribution center before the route until when the delivery vehicle 110 returns to the distribution center after the route is serviced. Furthermore, the digital route model 1136 may include identification of frequent stops (such as the determined or detected stops) and other stops that may occur along the route, such as due to traffic control points, and so forth. When the frequent stops have corresponding addresses or location information, the corresponding addresses or location information may be included with the frequent stop identifications. Additionally, the digital route model 1136 may include and/or identify travel segments along the route as determined by the solver 1111, as well as corresponding street names, and so forth. Furthermore, the digital route model 1136 may include a number of mail stops, mailboxes, traffic control points, total distance traveled while servicing the route, total time spent servicing the route, confidence levels of various aspects of the route, and other information relative to the physical route. For example, the digital route model 1136 may identify a number of u-turns, cul-de-sacs, and similar route features that provide information regarding the route traveled by the carrier. Furthermore, the digital route model 1136 may include or provide turn-by-turn directions for the carrier to follow while servicing the route. In some embodiments, the digital route model 1136 may be associated with a route score that measures or is indicative of input confidence, AMS compliance, mileage and/or time comparisons, and so forth).

In some embodiments, the digital route model 1136 may be used in or may utilize one or more other operations or systems. For example, the digital route model 1136 may utilize the RSD 1138 to ensure that the digital route model 1136 is using the most efficient routes to reach each of its corresponding stops and/or to populate information when maintaining or updating the digital route model 1136. In some embodiments, maintaining or updating the digital route model 1136 includes verifying that street names, etc., along the physical route corresponding to the digital route model 1136 have not changed. Alternatively, or additionally, maintaining or updating the digital route model 1136 may also include updating the digital route model 1136 based on a change in the information from the RSD (for example, a change in street closures, traffic control points, and so forth). In some embodiments, the RMSS 1138 may user the digital route model to generate and maintain the turn-by-turn directions for the carrier and to review route evaluations, for example to enable comparison of different digital routes and digital route models, and so forth. In some embodiments, the RMSS 1138 may also monitor and/or track carrier servicing of routes by comparing them to the digital route model 1136.

In some embodiments, the route optimizer 1140 may perform optimization functions or services on the digital route model 1136. In some embodiments, the route optimization functions may include identifying routes that need to be optimized, for example based on route evaluations or various parameters regarding the digital route model 1136, including time of travel, distance of travel, and so forth. In some embodiments, the route optimizer 1140 may perform resequencing of a single route or multiple routes. Resequencing of a single digital route model 1136 may include changing one or more of a stop sequencing order, addition or removal of one or more stops, change in segments traveled to service the stops, and/or other changes to the digital route model 1136. In some embodiments, optimization of the digital route model 1136 occurs before changes are implemented to the physical route so as to determine savings that are gained from the changes.

In some embodiments, the digital route model 1136 also enables review for Sunday routing 1142 and/or DMS servicing 1144.

Route Optimization

Route optimization may involve improving one or more aspects of the route to improve carrier efficiency while servicing the route and reducing costs associated with the route. For example, routes can be optimized by splitting routes, combining routes, altering routes, by reallocating delivery points between routes, and changing the delivery sequence, or any combination of these. In some embodiments, these costs may include any costs for servicing the route (for example, equipment costs, carrier costs, etc. In some embodiments, the route optimization is performed by a hardware processor 904 of FIG. 9 or a system comprising a hardware processor 904 and includes a plurality of functions or steps. Each of these functions or steps, when taken together as a whole or individually, may provide for execution, tracking, and implementation of route optimization.

The route optimization includes the processor 904 applying one or more compensation standards to the route serviced by the carrier. The compensation standards for the route may directly impact the costs for the route, and, thus may be relevant to optimizing the route for at least this reason. In some embodiments, applying the one or more compensation standards to the route involves using the current compensation standards to determine a cost for the route. In some embodiments, the compensation standards may be fluid and changeable; the system 900 or processor 904 should be able to adjust the route optimization based on the latest standards to apply.

The route optimization further includes the processor 904 performing service demand preparation. Service demand preparation for a route may include identifying one or more delivery locations that require service along the route. As delivery locations along a route change (for example, due to new construction, moves, etc.), the route may be automatically (for example, automatically at predetermined, calculated, or customized periods) updated or updated on demand (or based on a threshold number of known changes along the route), and so forth, to ensure that the route includes the most update-to-date and correct delivery point information. Ensuring that the route includes the proper delivery points may allow the route optimization to focus on actual costs as opposed to costs that no longer apply because a corresponding delivery point no longer exists or without excluding actual costs when the digital route does not include a stop that the carrier is required to make along the route.

The route optimization performed by the processor 904 further includes route prioritization. Route prioritization may include identifying routes and delivery locations (for example, within an area serviced by a distribution center). For example, when the distribution center services, for example, three neighborhoods in close proximity to each other with three separate routes, route prioritization reviews opportunities to consolidate the three routes into two routes or benefits of separating the routes into additional routes. Such route prioritization may focus on savings opportunities from reprioritizing the routes (for example, changes in associated costs) and confidences in the digital routes.

The route optimization further includes route reconstruction, as generally performed, for example, by the processor 904. Route reconstruction may involve generating or regenerating update digital routes for field communication and implementation tracking.

The route optimization performed by the processor 904 further includes cost savings calculations. These calculations may be predictive, identifying potential cost impacts that would result from optimization. When such calculations predict reduced costs, the optimization may be favorable with regard to the route(s). When the calculations predict increased costs, the optimization may be unfavorable with regard to the route(s). In some embodiments, the cost saving calculations specifically focus on determining evaluation and mileage cost impacts resulting from the route optimization.

The route optimization may further include field review preparation, as performed by the processor 904 or similar components or systems. The field review preparation may include generation of reports presenting new material in an easy to understand manner.

The route optimization performed by the processor 904 and/or the system 900 may be measured based on a variety of factors. For example, a successfully optimized route results in a route that includes all of the service demands (delivery points) along that route and can be successfully traversed by the assigned carrier. Another success indicator may be whether or not the optimized route can be successfully digitized and displayed on mapping software and/or can provided automated turn-by-turn directions. A successfully optimized route may also be able to have an automated delivery point sequence generated for it. The successfully optimized routes may also be able to have calculated estimated mileage and travel times associated with the routes and calculated savings associated with the optimized routes as compared to non-optimized or previous routes (including, for example, mileage and/or carrier cost/salary changes). In some embodiments, the calculated savings are available before the route is optimized and/or implemented (for example, predictable without requiring implementation). The successfully optimized route may also be able to provide a summary comparison of route details (such as numbers of right/left turns, and so forth).

As one example, a route which indicated a digitized route of 53 miles can be evaluated and resequenced to a shorter route. The optimized, resequenced route was 45.1 miles for a 15% reduction. The reduction increases efficiency and savings, and improves carrier performance. In one area of rural Virginia, there may be 38 routes which can be resequenced to reduce total mileage by 7%. This can result in 77 fewer miles driven each day for these 38 routes. Optimizing routes nationwide, assuming a 7% reduction, can reduce average mileage by over 214,000 miles per year, which can result in significant time and cost savings and efficiency improvements.

In some embodiments, the system 900 may include integration with or into an address management system for delivery points. Furthermore, the system 900 may be integrated with a maintenance selection system (for example, an RMSS). Furthermore, the system 900 may be implemented with or include a tracking system that identifies a status of a route, for example, whether the route is ready to be re-sequenced or whether there have been enough changes to the route to warrant reprocessing.

In some embodiments, the system 900 may be implemented as a platform that processes all GPS breadcrumbs and other inputs tracked by the delivery system 100. In some embodiments, the system 900 may be segmented to only handle a portion of the delivery system 100 (for example, a portion that relates to a particular geographic region or regions, such as cities or rural areas). For example, when the system 900 processes information for all rural routes of the delivery system 100, the system 900 may handle over 2,000,000,000 GPS breadcrumbs, over 5,000,000 scans from carrier MDDs, over 300,000 flats, and over 100,000 mailpieces daily (on average). This input data may be related to over 50,000,000 addresses that exist as potential delivery points in the rural routes. Furthermore, the compensation standards in place are used to determine costs for the routes that apply in the specified geographic region, for example, for the rural routes being handled by the system 900. The system 900 may also be connected to various other systems or databases to provide information that may be used in downstream processes. For example, the system 900 may be coupled to a road network system or database to provide the road network information used in route determination, etc., and hourly work trackers (for example, rural work hour tracker, RWHT) and mail count volume inputs.

Based on these varied inputs, the system 900 may perform: (1) GPS stop identification (as described above) to determine what travel action(s) the carrier associated with the corresponding GPS breadcrumb may be experiencing or taking (for example, at a delivery point, driving between delivery points, at a railroad crossing, and so forth); (2) scan classification of the scans received from the carrier MDD to identify a delivery point action that the carrier is performing; (3) mail volume classification; and (4) address classification. Based on the identifications and classifications described above, the system 900 may further perform GPS stop clustering, GPS address matching, compensation evaluation, time and motion analysis, and perform route optimization preparation, as described above. The system 900 may generate various outputs based on the inputs received. For example, the system 900 may generate line of travel and frequent stops (based on, for example, a route model) and compensation evaluations along with the time and motion studies and route optimization demands, as described above). The system 900 may also generate various information for use in further analysis, including unit data, route data, interval data, stop data, and address data, as is further detailed in Table 3:

TABLE 3

| Unit | Route | Interval | Stop | Address |
|---|---|---|---|---|
| General | General | General | General | General |
| Area | Route Identifiers | Street Name | Stop Type | Stop Type |
| District | Vehicle Type | Lane Count | (Mail, TCP, | ID/Address |
| Finance Number | Total Stops by | Average Historical | DDD) | Location Data |
| Location Data | Type | Speed | Subtype (Both | Geocode |
| Geocode | Location Data | Surface Type | AMS and TCP) | Geocode |
| Fuel Stop | Clustered Line | Location Data | Address Names | Historical |
| Geocode | of Travel | Street Geocodes | Total Addresses | Matched |
| Mail Volume | Daily Line of | Start | Location Data | Location |
| Total Parcels | Travel | Stop/Intersection | Clustered Stop | Historical Scan |
| Total | Digital Turn by | End | Geocode | Locations |
| Accountable | Turn Directions | Stop/Intersection | Daily Stop | Scan Data |
| Mail | Mail Volume | GPS Distance | Geocode | Historical Scans |
| Total Volume | Route Parcels | Distance | Scanner Device | (~2 years) |
| Total CR Flats | Route Volume | Skipped Stops | Data | Scan Types |
| Scanner Device | Route CR Flats | Total stops on | Parcel to | Scan Location |
| Data | Scanner Device | interval | Mailbox | Outliers |
| Device | Data | Stop locations | Parcel to Locker | Compliance |
| Compliance | Activity Scan | along interval | Parcel to Door | Scores |
| Scores | Compliance | Scanner Device Data | Accountable | |
| Time Data | Daily Scans | Scan Activity | Mail | |
| Total Street | Device | During Interval | Carrier Pickup | |
| Time | Blackouts | Time Data | Items and | |
| Total Office | Daily | Interval Duration | Events | |
| Time | Walk/Drive | Interval Speed | OOR | |
| Evaluations | Time Data | Evaluations | Walk/Drive | |
| Total Unit Cost | GPS Street and | Evaluated Demand | Distance and | |
| Total | Office | by Traversal | Location | |
| Walk/Drive | Load Vehicle | | Time Data | |
| | Duration | | Clustered Stop | |
| | Break/Lunch | | Average | |
| | Duration | | Duration | |
| | Evaluations | | Clustered Stop | |
| | Daily | | Frequency | |
| | Compensation | | Matched Stop | |
| | Evaluation | | Duration | |
| | Basic Service | | Stop Start/End | |
| | Time | | Time | |

TABLE 3-continued

| Unit | Route | Interval | Stop | Address |
|---|---|---|---|---|
| | Basic Drive Time | | Total Office Time | |
| | Basic Walk Time | | Evaluations Evaluation System | |
| | Basic TCP Time | | Engineered Matched Stop Duration | |

In some embodiments, system 900 may be configured to generate one or more reports that can identify actions being waited on before a route is verified or that the route is verified. In some embodiments, the reports can also include various details regarding the route, including turn by turn directions, associated costs, and so forth. In some embodiments, reports that identify savings provided by routes (for example, annualized, etc.) may be generated. In some embodiments, the reports may correlate the optimized route details with the previous, or non-optimized route details (for example, including digital versus current paid miles, route identifier, and so forth). In some embodiments, the optimized route may provide an average mileage reduction of between 5% and 10% or a reduced average time of 15 minutes, 30 minutes, 45 minutes, and so forth.

The optimized routes generated by the system 900 may include routes that have reduced mileage as compared to non-optimized routes. In some embodiments, the optimized routes may have reduced carrier time spent on other tasks or activities.

In some embodiments, the optimized route for a carrier may be compared to a nominal route for the carrier. In some embodiments, the nominal route may comprise a planned or scheduled route for the carrier, for example as previously generated when the route was originally created or from previous updates to the route. In some embodiments, a nominal route can be generated once a year, every six months, or at any other desired periodicity, and can use route data from previous route performances, the average of previous performances, and the like. Thus, the nominal route may include all expected office duties expected of the carrier as well as all street aspects of the route, which may include delivery points, traffic occurrences, and details of travel segments between delivery points. Each optimized route may have a corresponding nominal route. Once the optimized route is generated, as generated above, the delivery system 100 may compare the optimized route and the nominal route to identify distinctions or differences between the routes and identify an efficiency gained by the optimized route. The efficiency gained may be measured as a number of minutes gained in a workday for the carrier (for example, where the optimized route allows the carrier to end the optimized route earlier, for example, in less time, as measured by a number of minutes or a percentage difference in total time) than the nominal route, a number of miles reduced as compared to the nominal route (for example, where the optimized route is shorter in distance than the nominal route by a number of miles or by a given percentage of total distance), involves fewer items for delivery, and so forth. In some embodiments, when the efficiency gained exceeds a particular threshold (for example, the optimized route ends in less time, involves a shorter traveled distance, and so forth), then the delivery system 100 may flag the optimized route as one to be appended with additional delivery points, to be merged with another route, and/or to be split and merged with another route. As such, the optimizing of routes may result in a reduced number of total routes where the optimized routes may be consolidated into a fewer number of routes as compared to the nominal routes.

In some embodiments, part of generating the optimized routes comprises verifying that the optimized routes include relevant portions of the corresponding nominal routes. In some embodiments, the delivery system, the carrier, and/or another delivery resource may review the optimized routes and the corresponding nominal routes to identify the differences between the routes and to confirm that the optimized route includes and/or accounts for all relevant aspects of the nominal route. In some embodiments, the delivery system and/or the carrier may identify deltas between specific portions of the routes, for example the office portions. When these deltas exceeds a particular threshold, the delivery system and/or the carrier may determine additional activities that the carrier may perform (for example, additional activities that could be added to the optimized route) due to the increased efficiency of the optimized routes. In some embodiments, the delivery system 100 may calculate a score for the optimized route based on the compared efficiencies, standards, and so forth. In some embodiments, the score may correspond to how similar the optimized route is to the corresponding nominal route and/or the efficiency or other gains provided by the optimized route over the corresponding nominal route. In some embodiments, the score may correspond to both the similarity of the routes as well as the improvement in efficiency, and so forth.

Figure 12A:
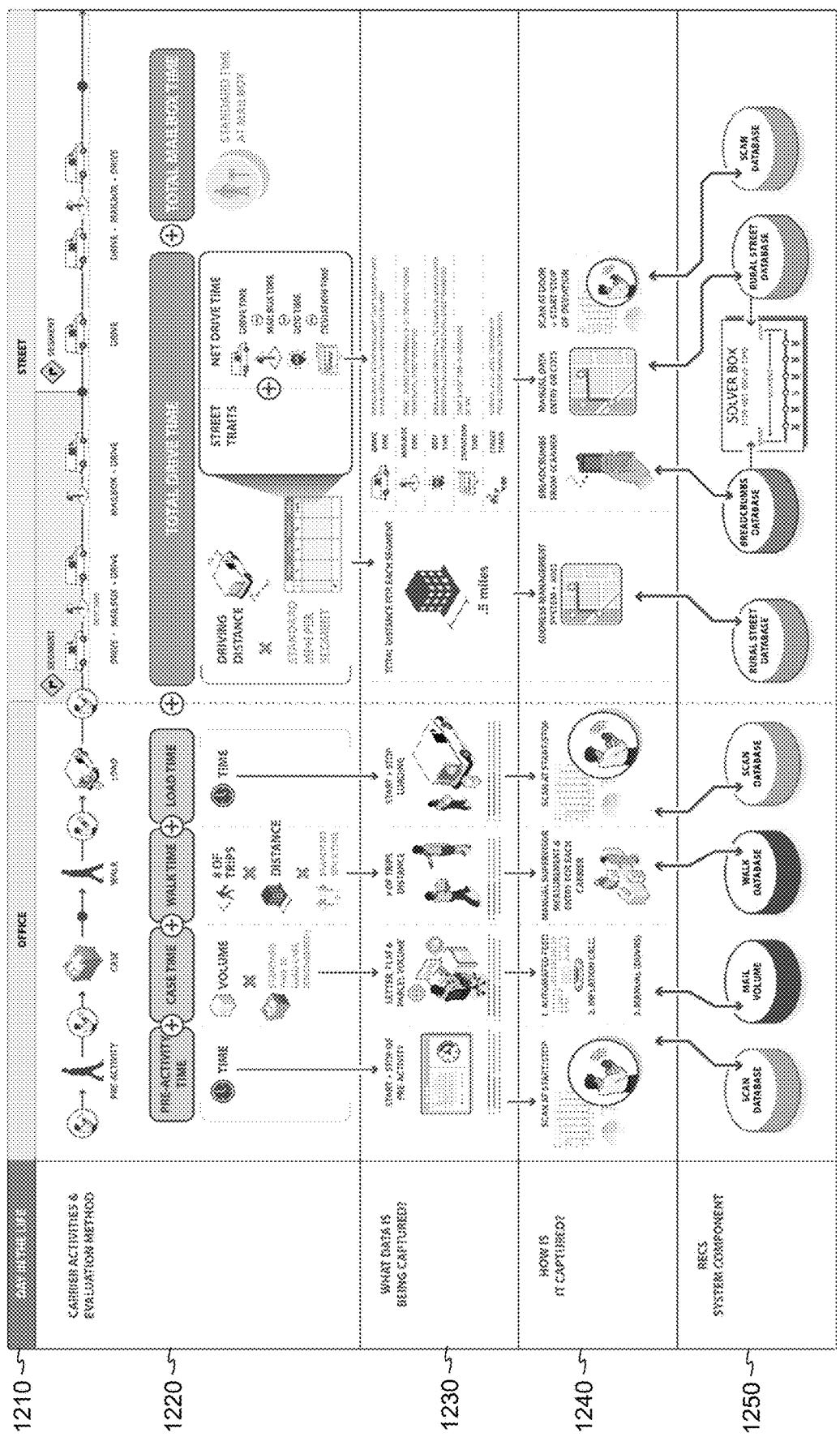
FIGS. 12A-B provide a diagram illustrating a day in the life of a carrier.
Figure 12B:
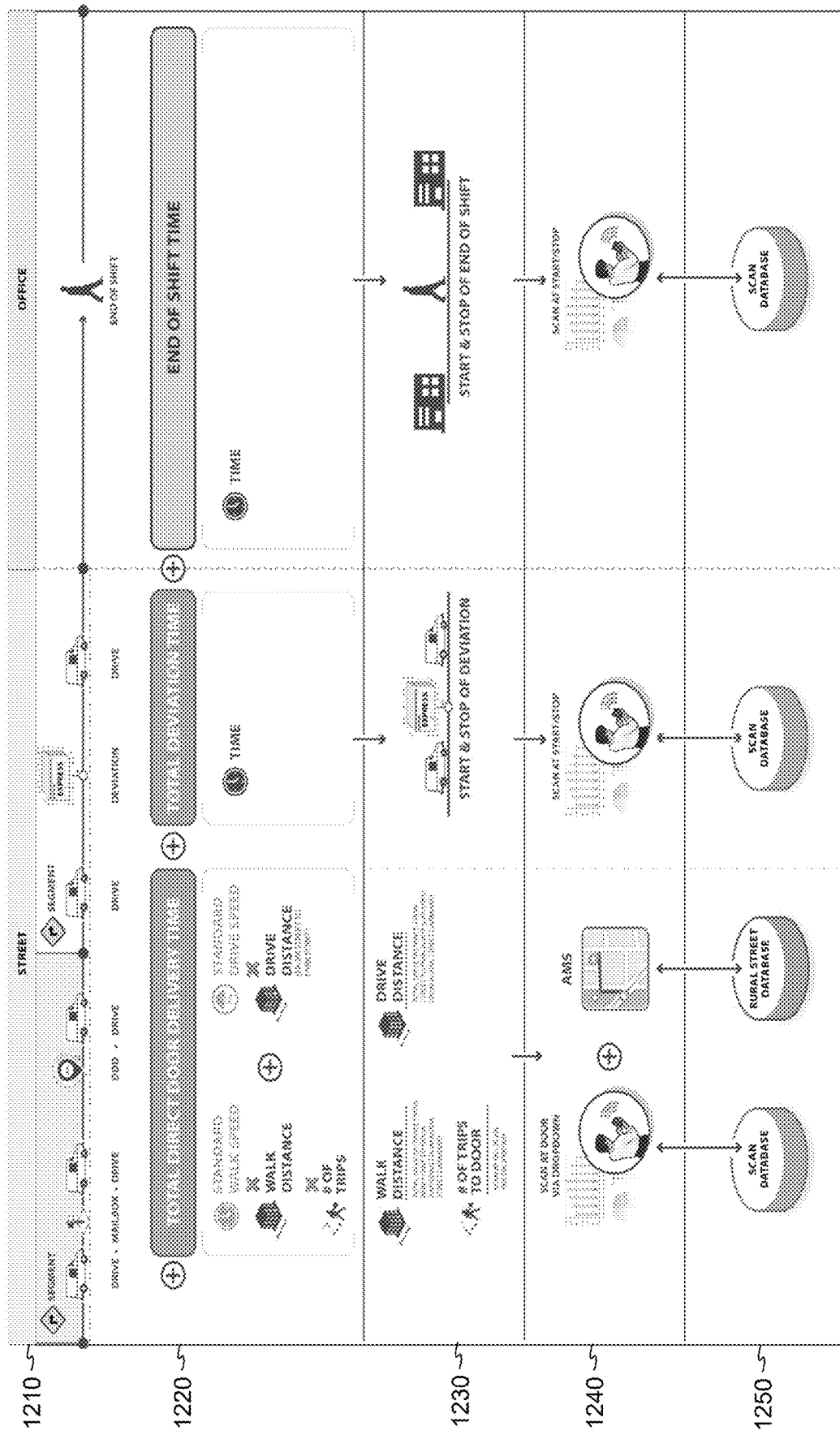

FIGS. 12A-B provide a diagram illustrating a exemplary activities performed in servicing a delivery route. The first row 1210 in the diagram identifies a location of one or more activities in the day of the life of the carrier. The second row 1220 in the diagram provides details of carrier activities during the day and how those particular activities are evaluated. As shown in FIG. 12A, each aspect of a carrier's day can be identified and recorded, including pre-activity, casing of mail items, walking to a vehicle, loading the vehicle, and traversing a route. While traversing the route, the carrier's activities are detected using breadcrumb data and analyzed to identify the activity, e.g., driving, stopping at a stoplight, delivering at a mailbox, delivering at door, lunch, etc. during each of these activities, the data being captured is recorded in the A third row 1230 in the diagram identifies data being captured for each of the activities performed by the carrier throughout the carrier's day. The data is captured from a variety of sources, including a mobile delivery device, delivery system networks, vehicle systems, etc.

A fourth row 1240 in the diagram identifies how the data from the third row 1230 is captured. The data can be captured by the carrier for by someone or something associated with the carrier or by a delivery network system as described herein.

A fifth row 1250 shows what system component may capture the data and/or utilize the captured data. The time through the day progresses across the diagram provided by FIGS. 12A-B from start of the day at the far left and end of the day at the far right.

The locations identified in the first row include an office, referring generally to the location where the carrier begin the day and performs activities in preparation for servicing or traveling along a route, and a street, which relates to the period of the day when the carrier is servicing or traveling along the route. The activities performed by the carrier includes the various activities that the carrier performs to prepare for servicing the route as well as the activities involved in servicing the route and completing the route. The second row also includes details regarding the times and other details that are tracked and/or evaluated for the carrier's displayed activities. The third row provides examples of details of the data being capture and/or evaluated for the respective carrier activities, while the fourth row details how the details are captured (for example, via a scan of the carrier's MDD, etc.). The fifth row indicates data flow between the captured data and the respective component in the system, as further detailed in FIGS. 10A and 10B herein.

Figure 13:
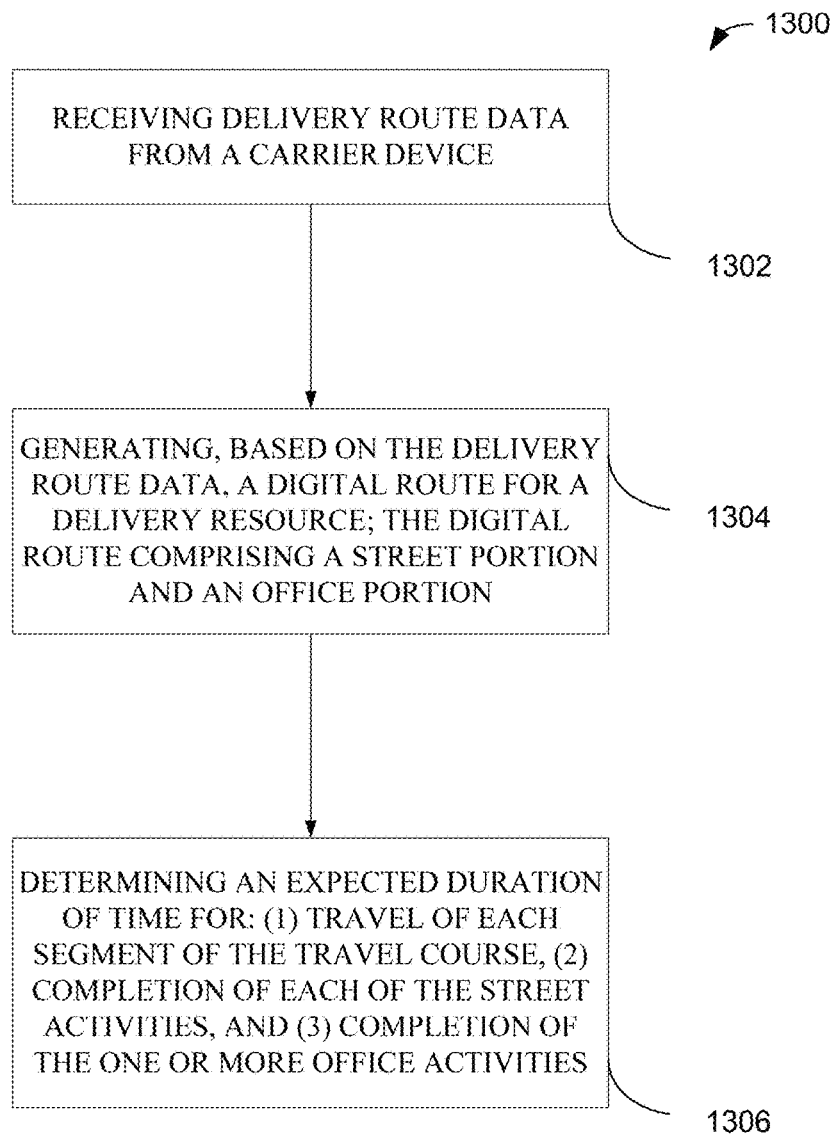
FIG. 13 is a method flowchart for an exemplary method of processing delivery route data according to exemplary methods and systems described herein.

FIG. 13 is a method flowchart for an exemplary method of processing delivery route data according to exemplary methods and systems described herein. In some aspects, the method 1300 discussed below with respect to FIG. 13 is performed by one or more of the components of the delivery system 100, for example the route management component 205, the vehicle route control component 230, the cost management component 240, request servicing component 205 discussed above with respect to FIG. 2. For example, one or more of the components of the delivery system 100 comprises the system 900 of FIG. 9 and/or include data defining instructions for to be performed by the system 900. The system 900 may execute (and/or store in the memory 906) the instructions, which configure the processor 904 to perform the functions of method 1300 discussed below. In some aspects, the method 1300 includes additional or fewer steps than shown or discussed or includes steps performed in a different order from that described herein.

Method 1300 begins at block 1302, where the system 900 receives delivery route data from a carrier device (and/or the delivery vehicle 105). The delivery route data may comprise data received from one or more of the MDD and/or the delivery vehicle 105. For example, this may include GPS data, time data, stop data, and/or any data generated based on an analysis of the received data. In effect, the delivery route data received comprises any data collected by the MDD and/or the delivery vehicle 105 while the carrier is servicing its route. Once the delivery route data is received, the system 900 progresses to block 1304.

At block 1304, the system 900 generates a digital route for the carrier whose device provided the delivery route data of block 1302, based on the delivery route data and based on the carrier's actual route. In some embodiments, the carrier's actual route is the route assigned to the carrier that identifies all delivery points, travel segments between the delivery points, traffic occurrences and/or variances, and so forth, that the carrier is expected to travel when servicing the route. The actual route may be predefined as generated on an earlier date and may not account for recent changes in delivery points, travel segments, and/or travel occurrences, and so forth. The digital route generated may correspond to a more accurate representation of the route serviced by the carrier, because the digital route, based on the delivery route data, includes aspects of the "real-world" details of the route encountered by the carrier, for which the actual carrier route may not account. As such, the carrier device that provides the delivery route data may travel with the carrier while the carrier services the actual route. The actual and digital routes may comprise street portions, corresponding to when the carrier is traveling to different delivery points and so forth, and office portions, corresponding to when the carrier is preparing to travel the delivery route or completing activities after travelling the delivery route. The street portions may comprise details regarding a plurality of delivery points at which the carrier is expected to perform a service, details regarding a segmented travel course for the carrier to visit each of the plurality of delivery points in a predetermined sequence and along accessible paths, and details regarding street activities that the carrier performs at the plurality of delivery points. In some embodiments, the office portion comprises details regarding one or more office activities, performed by the carrier, to prepare for or conclude the street portion of the actual route. In some embodiments, the details regarding the plurality of delivery points, the segmented travel course, the street activities, and the office activities are determined based on the delivery route data. Once the system 900 generates the digital route, the system 900 proceeds to block 1306.

At block 1306, the system 900 determines an expected duration of time for: (1) travel of each segment of the travel course, (2) completion of each of the street activities, and (3) completion of the one or more office activities. In some embodiments, these durations of time may be determined based on the standards, as described above with respect to Table 2. In some embodiments, based on the digital route, the system 900 may ensure that the expected durations of time account for all aspects of the optimized route. In some embodiments, once the expected durations of time are determined for each aspect of the digital route, the system 900 may determine an estimated cost for the digital route based on the determined expected durations of time. In some embodiments, the digital route corresponds to the optimized routes described herein.

Figure 14:
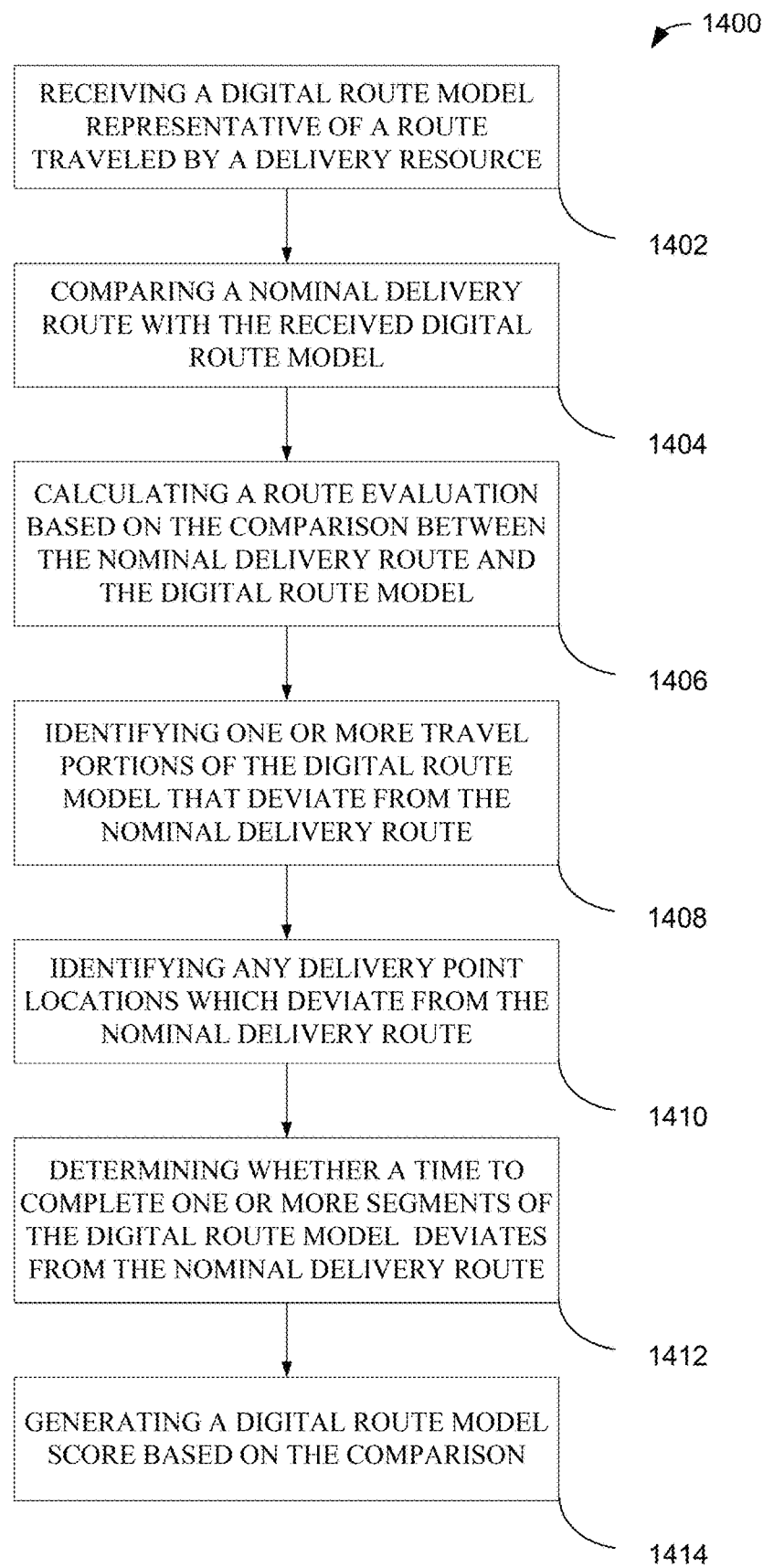
FIG. 14 is a method flowchart for an exemplary method of updating a route based on delivery route data according to exemplary methods and systems described herein.

FIG. 14 is a method flowchart for a method of updating a route based on delivery route data according to exemplary methods and systems described herein. In some aspects, the method 1400 discussed below with respect to FIG. 14 is performed by one or more of the components of the delivery system 100, for example the route management component 205, the vehicle route control component 230, the cost management component 240, request servicing component 205 discussed above with respect to FIG. 2. For example, one or more of the components of the delivery system 100 comprises the system 900 of FIG. 9 and/or include data defining instructions for to be performed by the system 900. The system 900 may execute (and/or store in the memory 906) the instructions, which configure the processor 904 to perform the functions of method 1300 discussed below. In some aspects, the method 1400 includes additional or fewer steps than shown or discussed or includes steps performed in a different order from that described herein.

Method 1400 begins at block 1402, where the system 900 receives a digital route model representative of a route traveled by a delivery resource. The digital route model may be generated based on data received from one or more of the MDD and/or the delivery vehicle 105. For example, digital route model may be generated based on data that includes GPS data, time data, stop data, and/or any data generated based on an analysis of the received data. In effect, the digital route model comprises any data collected by the MDD and/or the delivery vehicle 105 while the carrier is servicing its route and analyzed by the delivery system 100. Thus the digital route model may correspond the digital or optimized route generated based on the analysis of the digital route data received from the MDD and/or the delivery vehicle 105. Once the digital route model is received, the system 900 progresses to block 1404.

At block 1404, the system 900 may compare a nominal delivery route with the received digital route model. In some embodiments, the nominal delivery route corresponds to a planned or original route that the delivery resource was traveling when the digital route model was generated (for example, the route that the delivery resource was traveling when the digital route data was collected). In some embodiments, the comparison may be standard by standard comparison to identify time differences between each standard associated with different portions of the digital route model and the nominal delivery route. At block 1406, the system 900 may calculate a route evaluation based on the comparison between the nominal delivery route and the digital route model. In some embodiments, the route evaluation may comprise a percentage value identifying a difference between the nominal delivery route and the digital route model. The percentage value may be calculated based on a mileage difference between the nominal delivery route and the digital route model, a difference in time required to service the nominal delivery route as compared to the digital route model, and so forth. Alternatively, the route evaluation may comprise one of the mileage difference and the time difference as opposed to merely percentage calculations based thereon.

At block 1408, the system 900 may identify one or more travel portions of the digital route model that deviate from the nominal delivery route. In some embodiments, the travel portions may comprise one or more of street portions and office portions. Accordingly, the system 900 may identify where the digital route model (e.g., the optimized model) is improved or otherwise different from the nominal delivery route, for example the portions where the optimized route is improved over or otherwise changed from the nominal delivery route. At block 1410, the system 900 may identify any delivery point locations which deviate from the nominal delivery route. The identified delivery point locations that deviate may correspond to those delivery point locations that have changed since the nominal delivery route was generated, for example due to recent constructions, changes in route of travel, and so forth. In some embodiments, the system 900 may receive input from a respective carrier of the digital route model and/or the nominal delivery route to assist in identifying differences between the digital route model and the nominal delivery route and/or to identify differences in delivery point locations and other aspects of the digital route model and/or the nominal delivery route. At block 1412, the system 1400 may determine whether a time to complete one or more segments of the digital route model deviates from the nominal delivery route. This may be determined based on a comparison of the standards for each portion of the digital route model and the nominal delivery route, as described herein. In some embodiments, the system 900 may determine whether a mileage traveled to complete one or more segments of the digital route model deviates from the nominal delivery route. At block 1414, the system 1400 may generate a score for the digital route model based on the comparison of the nominal delivery route and the digital route model. In some embodiments, the score corresponds to the efficiency gains of the digital route model over the nominal delivery route, the improvements in time to complete the digital route model over the nominal delivery route, and/or the improvements in mileage traveled to complete the digital route model over the nominal delivery route. In some embodiments, the score is a combination of one or more of the efficiency gains and improvements.

Additional Embodiments

Those of skill will recognize that the various illustrative logical blocks, modules, circuits, and algorithm steps described as follows, and in connection with the embodiments disclosed herein may be implemented as electronic hardware, software stored on a computer readable medium and executable by a hardware processor, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such the processor reads information from, and write information to, the storage medium. In the alternative, the storage medium may be integral to the processor. The processor and the storage medium may reside in an ASIC.

While the above detailed description has shown, described, and pointed out novel features of the development as applied to various embodiments, it will be understood that various omissions, substitutions, and changes in the form and details of the device or process illustrated may be made by those skilled in the art without departing from the spirit of the development. As will be recognized, the present development may be embodied within a form that does not provide all of the features and benefits set forth herein, as some features may be used or practiced separately from others. All changes which come within the meaning and range of equivalency of the claims are to be embraced within their scope.

A person skilled in the art will recognize that each of these sub-systems may be inter-connected and controllably connected using a variety of techniques and hardware and that the present disclosure is not limited to any specific method of connection or connection hardware.

The technology is operational with numerous other general purpose or special purpose computing system environments or configurations. Examples of well-known computing systems, environments, and/or configurations that may be suitable for use with the invention include, but are not limited to, personal computers, server computers, hand-held or laptop devices, multiprocessor systems, microprocessor-based systems, a microcontroller or microcontroller based system, programmable consumer electronics, network PCs, minicomputers, mainframe computers, distributed computing environments that include any of the above systems or devices, and the like.

As used herein, instructions refer to computer-implemented steps for processing information in the system. Instructions may be implemented in software, firmware or hardware and include any type of programmed step undertaken by components of the system.

A microprocessor may be any conventional general purpose single- or multi-chip microprocessor such as a Pentium® processor, a Pentium® Pro processor, a 8051 processor, a MIPS® processor, a Power PC® processor, or an Alpha® processor. In addition, the microprocessor may be any conventional special purpose microprocessor such as a digital signal processor or a graphics processor. The microprocessor typically has conventional address lines, conventional data lines, and one or more conventional control lines.

The system may be used in connection with various operating systems such as Linux®, UNIX®, MacOS® or Microsoft Windows®.

The system control may be written in any conventional programming language such as C, C++, BASIC, Pascal, .NET (e.g., C#), or Java, and ran under a conventional operating system. C, C++, BASIC, Pascal, Java, and FORTRAN are industry standard programming languages for which many commercial compilers may be used to create executable code. The system control may also be written using interpreted languages such as Perl, Python or Ruby. Other languages may also be used such as PHP, JavaScript, and the like.

The foregoing description details certain embodiments of the systems, devices, and methods disclosed herein. It will be appreciated, however, that no matter how detailed the foregoing appears in text, the systems, devices, and methods may be practiced in many ways. As is also stated above, it should be noted that the use of particular terminology when describing certain features or aspects of the invention should not be taken to imply that the terminology is being re-defined herein to be restricted to including any specific characteristics of the features or aspects of the technology with which that terminology is associated.

It will be appreciated by those skilled in the art that various modifications and changes may be made without departing from the scope of the described technology. Such modifications and changes are intended to fall within the scope of the embodiments. It will also be appreciated by those of skill in the art that parts included in one embodiment are interchangeable with other embodiments; one or more parts from a depicted embodiment may be included with other depicted embodiments in any combination. For example, any of the various components described herein and/or depicted in the Figures may be combined, interchanged or excluded from other embodiments.

With respect to the use of substantially any plural and/or singular terms herein, those having skill in the art may translate from the plural to the singular and/or from the singular to the plural as is appropriate to the context and/or application. The various singular/plural permutations may be expressly set forth herein for sake of clarity.

The term "comprising" as used herein is synonymous with "including," "containing," or "characterized by," and is inclusive or open-ended and does not exclude additional, unrecited elements or method steps.

All numbers expressing quantities of ingredients, reaction conditions, and so forth used in the specification and claims are to be understood as being modified in all instances by the term "about." Accordingly, unless indicated to the contrary, the numerical parameters set forth in the specification and attached claims are approximations that may vary depending upon the desired properties sought to be obtained by the present invention. At the very least, and not as an attempt to limit the application of the doctrine of equivalents to the scope of the claims, each numerical parameter should be construed in light of the number of significant digits and ordinary rounding approaches.

The above description discloses several methods and materials of the present development. This development is susceptible to modifications in the methods and materials, as well as alterations in the fabrication methods and equipment. Such modifications will become apparent to those skilled in the art from a consideration of this disclosure or practice of the development disclosed herein. Consequently, it is not intended that this development be limited to the specific embodiments disclosed herein, but that it cover all modifications and alternatives coming within the true scope and spirit of the development as embodied in the attached claims.

As will be understood by those of skill in the art, in some embodiments, the processes set forth in the following material may be performed on a computer network. The computer network having a central server, the central server having a processor, data storage, such as databases and memories, and communications features to allow wired or wireless communication with various parts of the networks, including terminals and any other desired network access point or means.

What is claimed is:

1. A method of delivering items, the method comprising:
  storing, in a memory, a nominal delivery route comprising a plurality of nominal delivery points each having geographic coordinates;
  receiving, in a server, following completion of deliveries along a delivery route, delivery route data from a carrier device, the delivery route data comprising breadcrumb data and scan data;
  identifying, in a server, using the received delivery route data, a plurality of stops along the delivery route based on the breadcrumb data and the scan data;
  determining, in a server, which of the identified plurality of stops correspond to delivery points;
  comparing the identified plurality of stops which correspond to delivery points with the stored nominal delivery points;
  updating the geographic coordinates of the plurality of nominal delivery points with geographic coordinates of the identified plurality of stops which correspond to delivery point;
  determining that identified stops of the plurality of stops which do not correspond to delivery points are unplanned stops;

generating, in a processor, using the updated geographic coordinates of the plurality of nominal delivery points and the unplanned stops, a digital route for a delivery resource; and determining an expected duration of time for travel of each segment of the digital route and completion of each segment of the digital route.

2. The method of claim 1, wherein the breadcrumb data comprises GPS breadcrumb data, and the scan data comprises one or more item scans.

3. The method of claim 1, further comprising collecting the delivery route data via the carrier device as the delivery resource travels the delivery route.

4. The method of claim 3, further comprising determining an address for each of the identified plurality of delivery points using the breadcrumb data from the carrier device.

5. The method of claim 4, wherein determining which of the identified plurality of stops correspond to delivery points comprises:
  receiving route data for a plurality of delivery days;
  detecting, in the route data for the plurality of delivery days, locations of frequent carrier stop,
  clustering the locations of frequent carrier stops; and
  matching the locations of the frequent carrier stops to one or more of the plurality of nominal delivery points.

6. The method of claim 3, wherein generating the digital route comprises analyzing the breadcrumb data from the carrier device to determine an amount of time spent walking from a delivery vehicle to a delivery location associated with a corresponding delivery point and an amount of time spent servicing the corresponding delivery point.

7. The method of claim 5, wherein generating the digital route comprises determining a representative point for each cluster determined to correspond to delivery points of the plurality of delivery points and generating a line of travel between the representative points for each cluster, and mapping each line of travel to corresponding accessible paths on a map.

8. The method of claim 1, further comprising generating an estimated computational cost for the digital route compared to the stored nominal delivery route.

9. The method of claim 8, wherein generating the digital route comprises determining one or more office activities that the delivery resource performs in an office portion to prepare for or conclude a street portion of the delivery route.

10. An apparatus for processing item delivery, the apparatus comprising:
  a hardware memory configured to store processor executable instructions; and
  one or more hardware processors configured to execute the processor executable instructions to:
    storing, in a memory, a nominal delivery route comprising a plurality of nominal delivery points each having geographic coordinates;
    receive, following completion of deliveries along a delivery route, delivery route data from a mobile computing device, the delivery route data comprising breadcrumb data and scan data;
    identify, using the received delivery route data, a plurality of stops along the delivery route based on the breadcrumb data and the scan data;
    determine, which of the plurality of stops correspond to delivery points;
    compare the identified plurality of stops which correspond to delivery points with the stored nominal delivery points;
    update the geographic coordinates of the plurality of nominal delivery points with geographic coordinates of the identified plurality of stops which correspond to delivery point;
    determine that identified stops of the plurality of stops which do not correspond to delivery points are unplanned stops;
    generate, using updated geographic coordinates of the plurality of nominal delivery points and the unplanned stops, a digital route for a delivery resource, and
    determine an expected duration of time for travel of each segment of the digital route and completion of each segment of the digital route.

11. The apparatus of claim 10, wherein the breadcrumb data comprises GPS breadcrumb data of the mobile computing device, and the scan data comprises one or more item scans.

12. The apparatus of claim 11, wherein the one or more hardware processors are configured to collect the delivery route data via the mobile computing device as the delivery resource travels the delivery route.

13. The apparatus of claim 12, wherein executing instructions to determine the digital route further comprises executing instructions to determine an address of each of the delivery points.

14. The apparatus of claim 10, wherein executing instructions to determine which of the identified plurality of stops correspond to delivery points comprises executing instructions to:
  receiving route data for a plurality of delivery days;
  cluster locations of frequent carrier stops into a single frequent stop; and
  match the single frequent stop to one or more of the plurality of delivery points along the nominal delivery route.

15. The apparatus of claim 14, wherein executing instructions to generate the digital route comprises executing instructions to analyze the mobile computing device location to determine an amount of time spent walking from a delivery vehicle to a delivery location associated with a corresponding delivery point and an amount of time spent servicing the corresponding delivery point.

16. The apparatus of claim 12, wherein executing instructions to generate the digital route comprises executing instructions to determine a representative point for each cluster determined to correspond to delivery points of the plurality of delivery points and generate a line of travel between each delivery point of the plurality of delivery points and map each line of travel to corresponding accessible paths on a map.

17. The apparatus of claim 11, wherein executing instructions to determine the digital route comprises executing instructions to determine one or more office activities that the delivery resource performs to prepare for or conclude a street portion of the delivery route.

* * * * *